United States Patent
Moshrefzadeh et al.

(10) Patent No.: US 6,449,089 B1
(45) Date of Patent: Sep. 10, 2002

(54) REAR PROJECTION SCREEN WITH ENHANCED CONTRAST

(75) Inventors: Robert M. Moshrefzadeh, St. Paul; Patrick A. Thomas, Maplewood; Hassan Sahouani, Hastings; Daniel Croswell, Brooklyn Park, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/274,585

(22) Filed: Mar. 23, 1999

Related U.S. Application Data

(63) Continuation-in-part of application No. 09/192,118, filed on Nov. 13, 1998, which is a continuation-in-part of application No. 09/050,489, filed on Mar. 30, 1998, which is a continuation-in-part of application No. 09/095,835, filed on Jun. 11, 1998.

(51) Int. Cl.[7] ............................ G03B 21/56; G03B 21/60
(52) U.S. Cl. ...................................... 359/454; 359/460
(58) Field of Search ................................ 359/443, 452, 359/453, 460, 454

(56) References Cited

U.S. PATENT DOCUMENTS

| | | | |
|---|---|---|---|
| 2,287,556 A | 6/1942 | Land | 38/24 |
| 2,380,241 A | 7/1945 | Jelley et al. | 88/28.93 |
| 3,388,027 A | 6/1968 | Altman | 161/4 |
| 3,609,000 A | 9/1971 | Miyano et al. | 350/126 |

(List continued on next page.)

FOREIGN PATENT DOCUMENTS

| | | | |
|---|---|---|---|
| DE | 19627105 | 7/1995 | |
| EP | 269324 | 11/1987 | C08F/265/04 |
| EP | 342283 | 11/1989 | C08L/101/00 |
| EP | 783 133 | 7/1997 | G03B/21/60 |
| EP | 807849 | 11/1997 | |
| JP | 10003125 | 7/1984 | |
| JP | 1-47308 | 10/1989 | |
| JP | 4-324848 | 11/1992 | |
| JP | 6-59107 | 3/1994 | |
| JP | 6-059107 | 3/1994 | |
| JP | 6067308 | 3/1994 | G02B/21/62 |
| JP | 7-216328 | 8/1995 | |
| JP | 08339036 | 12/1996 | |
| JP | 9-114001 | 5/1997 | |
| JP | 9127314 | 5/1997 | |
| JP | 9160132 | 6/1997 | |
| JP | 9197109 | 7/1997 | |
| JP | 9265004 | 10/1997 | |

(List continued on next page.)

OTHER PUBLICATIONS

Goldenberg et al., "Diffraction analysis of bulk diffusers for projection–screen applications", J. Opt. Soc. Am., vol. 2, No. 12, Dec., 1985.
(Anonymous), "Rear projection screen for LCD projection", Research Disclosure, Jul., 1994, pp. 341.
Eliyahu et al., "Angular intensity and polarization dependence of diffuse transmission through random media", J. Opt. Soc. Am., vol. 10, No. 3, Mar. 1993.
Document No. 363007 filed Jun. 20, 1994 Rd.

*Primary Examiner*—Christopher Mahoney
(74) *Attorney, Agent, or Firm*—William D. Miller

(57) ABSTRACT

Projection screen assemblies include one or more birefringent retarding layers and one or more polarizing layers. The retarding and polarizing layers reduce the unwanted reflection of ambient and image light. One embodiment of a screen assembly includes a dispersing layer having an input side to receive light from a light source and a first retarding layer disposed to alter the polarization of the light transmitted by the dispersing film. A first polarizer substantially transmits light received from the first retarding layer in a first polarization state and absorbs light received from the first retarding layer in a second polarization state orthogonal to the first polarization state.

44 Claims, 14 Drawing Sheets

U.S. PATENT DOCUMENTS

| | | | | |
|---|---|---|---|---|
| 3,712,707 A | | 1/1973 | Henkes, Jr. | 350/122 |
| RE28,634 E | | 12/1975 | DePalma | 350/126 |
| 4,083,626 A | | 4/1978 | Miyahara et al. | 350/117 |
| 4,165,153 A | | 8/1979 | Land | 350/126 |
| 4,566,756 A | | 1/1986 | Heijnemans | 350/126 |
| 4,679,900 A | | 7/1987 | McKechnie et al. | 350/126 |
| 4,730,897 A | | 3/1988 | McKechnie et al. | 350/128 |
| 4,773,731 A | | 9/1988 | Goldenberg et al. | 350/128 |
| 5,148,309 A | * | 9/1992 | Yamada et al. | 359/443 |
| 5,193,015 A | * | 3/1993 | Shanks | 359/53 |
| 5,307,205 A | | 4/1994 | Ludwig, Jr. et al. | 359/453 |
| 5,347,644 A | * | 9/1994 | Sedlmayr | 359/465 |
| 5,400,069 A | * | 3/1995 | Braun et al. | 348/20 |
| 5,473,454 A | | 12/1995 | Blanchard | 359/69 |
| 5,486,884 A | * | 1/1996 | De Vaan | 353/122 |
| 5,594,561 A | | 1/1997 | Blanchard | 349/59 |
| 5,607,764 A | | 3/1997 | Konno et al. | 428/327 |
| 5,751,478 A | | 5/1998 | Yoshimura et al. | 359/453 |
| 5,760,954 A | * | 6/1998 | Tatsuki et al. | 359/452 |
| 5,867,239 A | | 2/1999 | Sahouani et al. | 349/117 |
| 6,064,521 A | * | 5/2000 | Burke | 359/443 |
| 6,147,801 A | * | 11/2000 | Goldenberg et al. | 359/452 |
| 6,278,546 B1 | * | 8/2001 | Dubin et al. | 359/452 |

FOREIGN PATENT DOCUMENTS

| | | | |
|---|---|---|---|
| JP | 9325426 | 12/1997 | |
| KR | 97009321 | 7/1995 | |
| WO | WO 93/15585 | 8/1993 | H04N/5/74 |
| WO | WO 96/31803 | 10/1996 | G03B/21/62 |
| WO | WO 97/01610 | 1/1997 | C09J/7/02 |

* cited by examiner

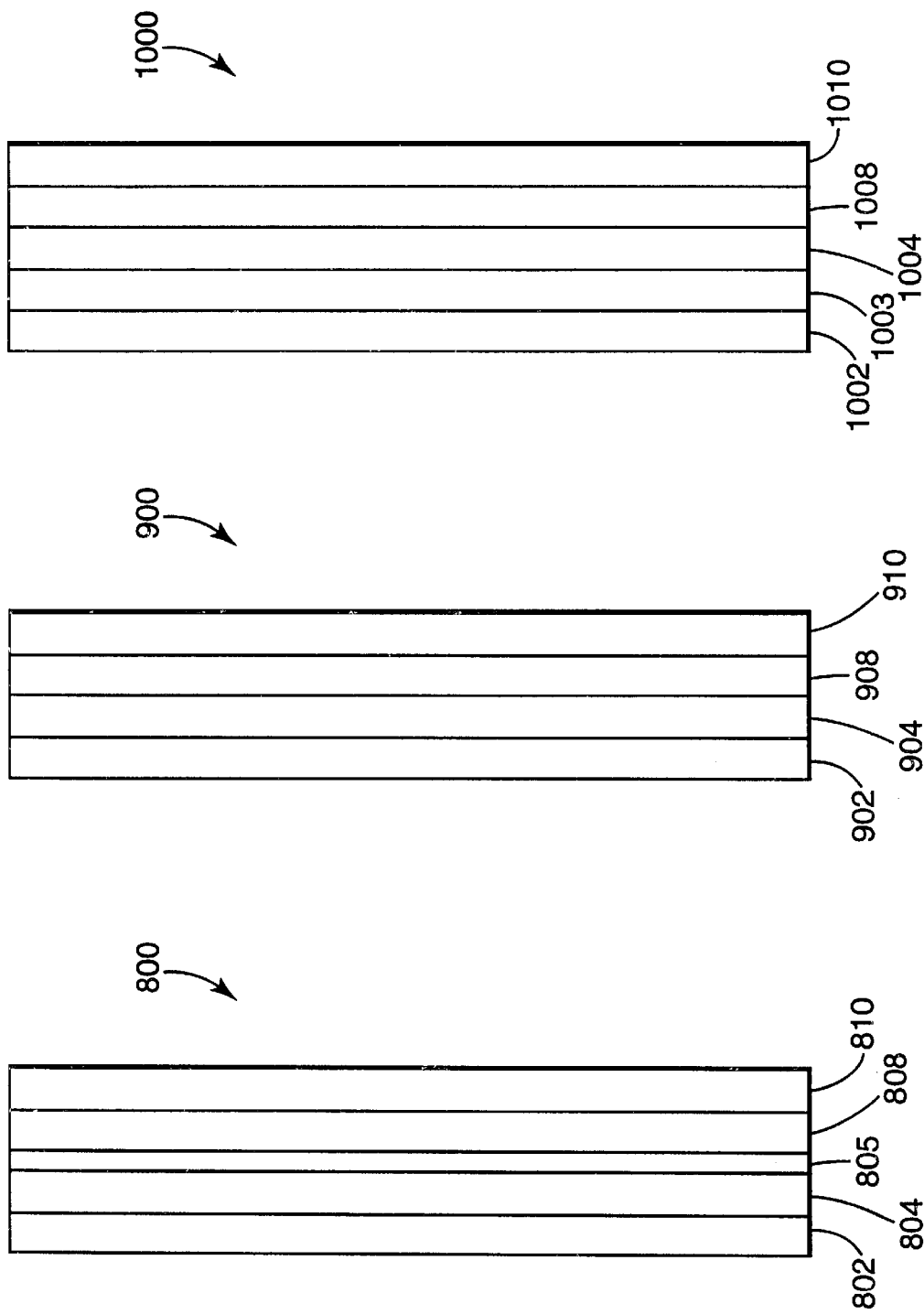

REAR PROJECTION SCREEN WITH ENHANCED CONTRAST

This is a continuation-in-part application of U.S. patent application Ser. No. 09/095,835, filed Jun. 11, 1998, and of U.S. patent application Ser. No. 09/192,118, filed Nov. 13, 1998, which is a continuation-in-part of U.S. patent application Ser. No. 09/050,489, filed on Mar. 30, 1998, all of which are incorporated herein by reference.

BACKGROUND

This invention relates generally to transmissive screens, and more particularly to transmissive screens suitable for use in rear projection systems.

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen. Typical screen characteristics used to describe a screen's performance include gain, viewing angle, resolution, contrast, the presence of undesirable artifacts such as color and speckle, and the like. It is generally desirable to have a rear projection screen that has high resolution, high contrast and a large gain. It is also desirable that the screen spread the light over a large viewing space. Unfortunately, as is described more fully below, as one screen characteristic is improved, one or more other screen characteristics often degrade. For example, in order to increase the screen gain using the same overall structure, one must decrease the viewing angle over which the screen is readily observable. As a result, certain tradeoffs are made in screen characteristics and performance in order to produce a screen that has overall acceptable performance for the particular rear projection display application.

Thus, there remains a need for screens that have improved overall performance while meeting the minimum performance criteria necessary for the rear projection display application in which the screen is used.

SUMMARY

Generally, the present invention relates to projection screen assemblies. In particular, the invention relates to projection screen assemblies that include one or more birefringent retarding layers and one or more polarizing layers. The retarding and polarizing layers reduce the unwanted reflection of ambient and image light.

In one embodiment, a screen assembly includes a dispersing layer having an input side to receive light from a light source and a first retarding layer disposed to alter the polarization of the light transmitted by the dispersing film. A first polarizer substantially transmits light received from the first retarding layer in a first polarization state and absorbs light received from the first retarding layer in a second polarization state orthogonal to the first polarization state.

Another embodiment of the invention is a projection system having a screen and an image projector projecting an image having a first polarization state onto the screen. The screen includes a light dispersing element, a first retarding layer, and a first polarizing layer. The first retarding layer is oriented to convert the image from to a transmission polarization state substantially parallel to a transmitted polarization direction of the polarizing layer.

Another embodiment of the invention is a screen assembly, with dispersing means, first birefringent retarding means disposed to receive light from the dispersing means; and first polarizing means disposed to receive light from the second birefringent retarding means.

Another embodiment of the invention is a screen assembly for displaying an image having a first polarization state. The screen includes a first polarizing layer oriented to substantially transmit light in the first polarization state and a first retarding layer disposed to receive light from the first polarizing layer. A light dispersing layer is disposed to receive light from the first retarding layer.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 8 illustrates a projection screen assembly in accordance with another embodiment of the invention;

FIG. 9 illustrates a projection screen assembly in accordance with another embodiment of the invention;

FIG. 10 illustrates a projection screen assembly in accordance with another embodiment of the invention;

Figure 1:
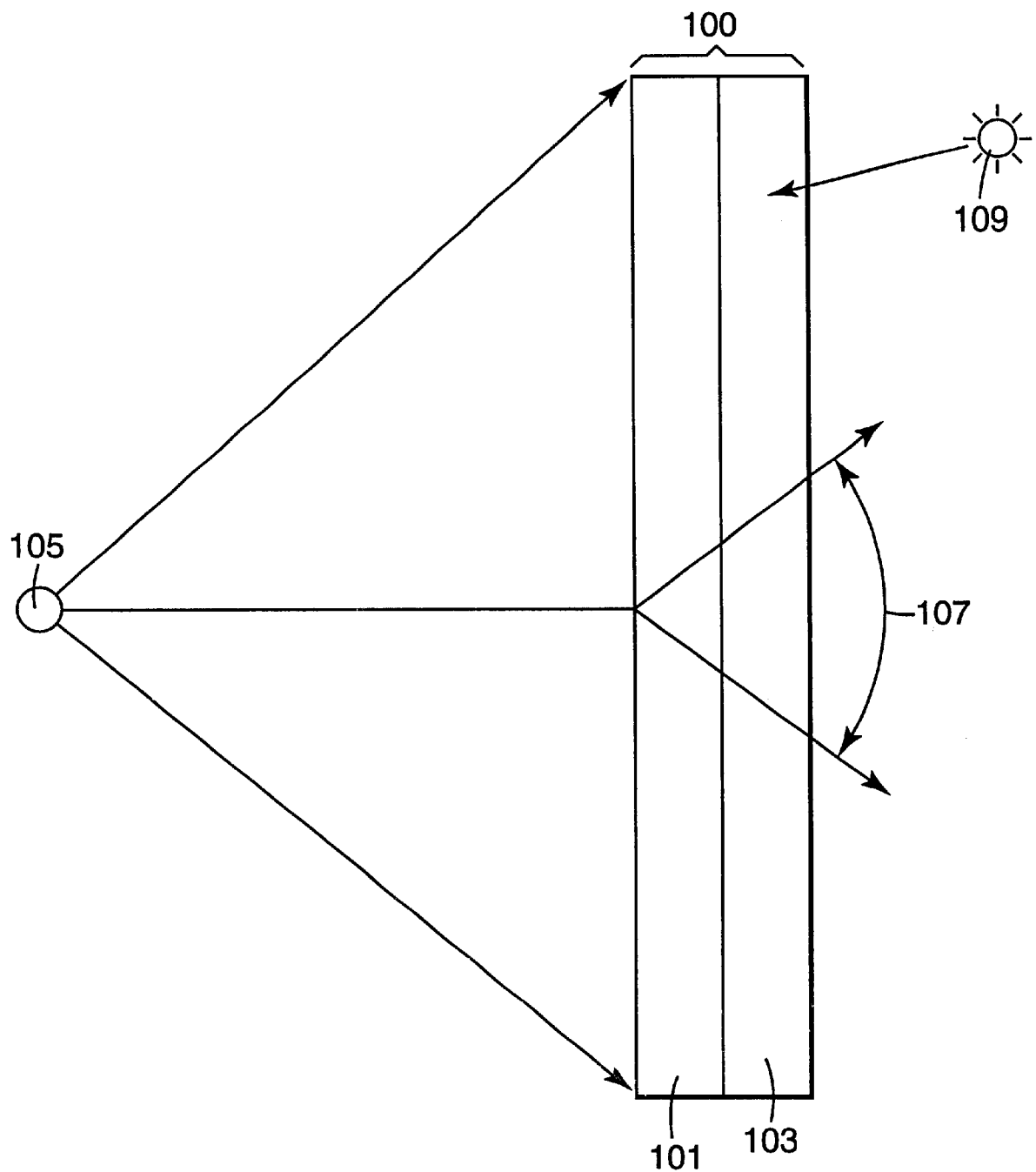
FIG. 1 illustrates a projection screen assembly.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally applicable to a number of different screen assemblies and is particularly suited to screen assemblies used in rear projection systems.

A rear projection screen 100 is described with reference to FIG. 1. The rear projection screen 100 includes a dispersing element 101 and an absorbing polarizer element 103. The dispersing element 101 spreads the light of a polarized image projected from a projector 105 and incident on the rear of the screen 100 to a desired viewing angle 107 on the viewing side of the screen. The viewing angle may be either symmetric or asymmetric depending on the desired application. One function of the absorbing polarizing element 103 is to improve the contrast of the screen 100 when the screen 100 is used in the presence of ambient light 109. The contrast is improved by absorbing a portion of the ambient light incident on the viewer side of the screen (which is unpolarized) that would otherwise be reflected by the screen and reduce the image contrast. The transmission direction of the polarizing element 103 is aligned with the polarization direction of the projected image in order to minimize any absorption of the projected image by the polarizing element 103. As will be appreciated, absorbing approximately half of the ambient light without significantly absorbing the image transmitted through the screen assembly 100 enhances the contrast of the screen when measured in the presence of ambient light.

The amount of image light absorbed by the polarizing element 103 depends in part on the polarization preserving capability of the screen. Thus, it is generally desirable to use a dispersing element 101 that does not significantly depolarize the image light as it is dispersed by, and transmitted through, the dispersing element 101. Dispersing elements are often referred to as diffusing elements. In one embodiment, a polarization-preserving, bulk diffuser, comprised of particles suspended within a layer of binder, is used as the dispersing element 101. The type of particles used and the manner in which they are dispersed in the binder each have an effect on the polarization-preserving characteristic of the dispersing element. To achieve good polarization preservation, its is generally desirable that the particles be spherical, that the binder layer be thin and that the particle loading in the binder be low. The thickness of the binder layer and the particle loading also affect the gain and viewing angle of the screen and such affects must be taken into account when designing the dispersing element 101.

The screen assemblies of the present invention are particularly suited for use in projection systems that utilize a polarized image source. In accordance with one embodiment of the invention, a liquid crystal display (LCD) based projector, for example, can be used in a projection system to project a polarized image onto a screen assembly of the type described herein. The projection system may vary in size from relatively small data monitors, to large screen TVs and video walls. The projection system may also rely on a folded image projection path such as the various projection systems described in European patent application EP 783133 entitled "Projecting Images", the contents of which are incorporated herein by reference. As will be appreciated from the descriptions below, such systems particularly benefit from the use of the various screen assemblies described herein. Where the projection system uses a polarization sensitive mirror as described in EP 783133, the addition of an absorbing polarizer in the screen assembly further enhances the performance of the projection system. The absorbing polarizer of the screen assembly may also serve as a clean-up polarizer for other components in a projection system including, for example, imagers (e.g., LCD imagers), polarization sensitive beamsplitters and mirrors, retarders and the like.

A more detailed description of the various screen characteristics is provided below. One important screen characteristic is gain. The gain of a screen is a representation of the screen's brightness as a function of viewing angle. The gain is typically calibrated using an ideal Lambertian reflector with the gain of the ideal Lambertian standard set at 1 for all angles. The peak gain of a screen (or screen element) corresponds to the highest gain at some angle. For example, the peak gain of a bulk diffuser screen, illuminated from behind at normal incidence, is typically observed for the light transmitted through the screen at an angle normal to the screen surface.

Another important screen characteristic is viewing angle. The viewing angle of a screen, as used herein, is the angle at which the gain of the screen drops to half of the peak gain, or to half of the one-axis gain. The viewing angle typically corresponds to the angle at which the intensity of the transmitted image drops to half of the intensity of light transmitted normal to the screen surface.

An important measure of screen performance is contrast. Contrast is generally the ratio of luminance of a projected white image to that of a projected black image. As such, numerical contrast numbers are dependent on the light source and the imaging optics. The contrast ratio tends to increase with increasing screen brightness and as the projected black image is made blacker. In one instance, contrast may be measured in terms of the dynamic range of the system. The dynamic range is a measure of the contrast ratio in the absence of ambient light. When a projection display is used in the presence of ambient light, some of the ambient light may be reflected from the screen. The reflected light typically includes both specular and diffuse components. The ambient reflection tends to decrease the contrast of the screen. Thus, if the screen is used in the presence of ambient light, the contrast ratio is also dependent upon the ability of the screen to absorb the ambient light: it is particularly desirable to reduce the amount of ambient reflection from the screen. Therefore, the amount of ambient reflectance provides another useful measure of screen performance.

Another characteristic of a screen is its ability to eliminate color and speckle effects. In certain screens color may be observed as a random pattern of differently colored, pixel-like spots on the screen. Such color artifacts typically result from wavelength-dependent effects, such as scattering in which different wavelengths are scattered in different directions or with different efficiency. As a result of the wavelength-dependent effects, different colors may become physically separated and observable on the viewer side of the projection screen. Increasing the thickness of the screen until the observer cannot resolve any color separation may be used to reduce color artifacts on a screen using a bulk diffuser. The thickness of the bulk diffuser is not necessarily a free variable to be selected only to reduce color effects, and so the diffuser thickness is typically selected to be a compromise value that optimizes several different screen characteristics.

The resolution provided by the rear projection screen is becoming more important as rear projection displays are used in applications with increasingly higher resolution requirements, for example high definition television. The resolution of a screen is generally defined as a measure of the finest detail that can be distinguished in an image projected on the screen. One method of measuring resolution is accomplished by projecting an image on the screen representing a series of sets of dark and bright lines at progressively smaller spacing to ascertain the limiting number of lines per millimeter that can be resolved. Using this method the resolution of the screen can be quantified as the ability to resolve horizontal and/or vertical bars at different spatial frequencies.

Figure 2A:
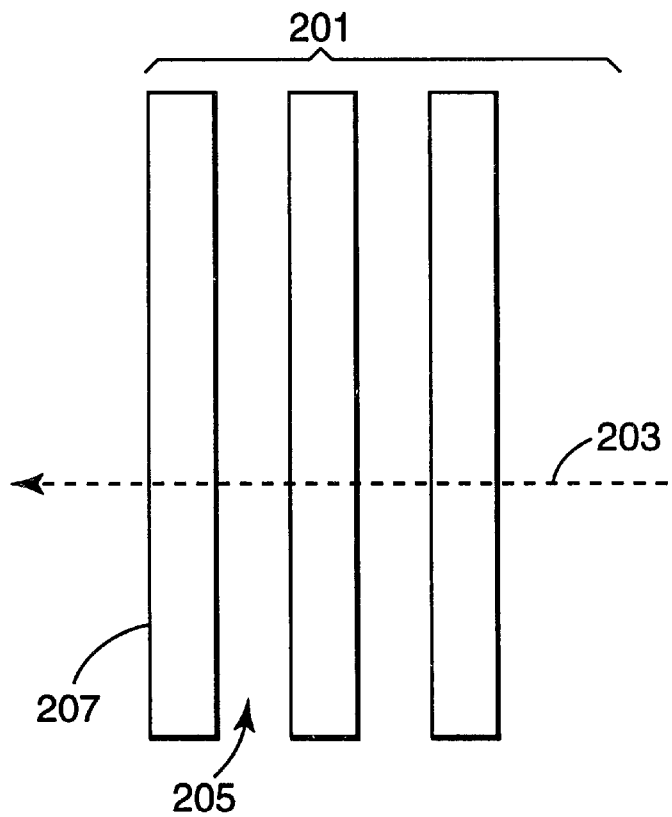
FIGS. 2A and 2B depict a mechanism for characterizing resolution of screen assemblies.
Figure 2B:
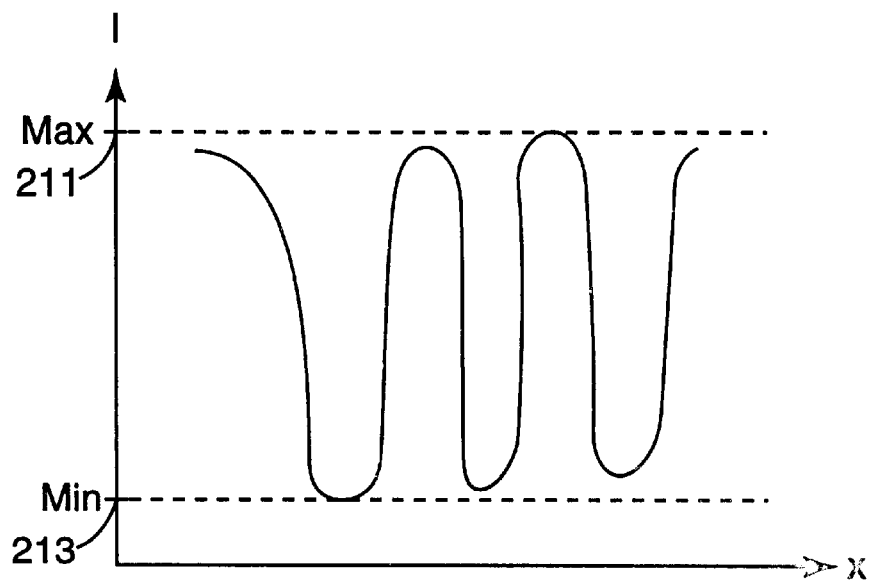

Screen resolution can be quantified by measuring the modulation depth (MD) depth of the screen in the manner depicted in FIGS. 2A and 2B. As illustrated in FIG. 2A, the modulation depth is measured by examining a pattern 201 of repeating bright 205 and dark 207 images, having a specified spatial frequency, transmitted through the screen. The pattern 201 is scanned along a line 203 orthogonal to the bars. The scan measures the intensity of light as a function of position along the scan line 203. The results of such a scan can be graphically represented by plotting the intensity as a function of position along the scan line 203 as illustrated in FIG. 2B. The scanned intensities can be used to calculate an intercharacter contrast (ICC) value. ICC is the ratio of intensities according to the relationship:

$$ICC = I_{max}/I_{min},$$

where $I_{max}$ is the maximum intensity 211 of the scan and ICC is the minimum intensity 213 of the scan.

The modulation depth of the screen is calculated from the ICC according to the relationship:

$$MD = \frac{ICC - 1}{ICC + 1},$$

which represents a normalized value. As will be appreciated, the modulation depth of any measured element lies between 0 and 1, with 1 being perfect resolution and 0 being an unresolvable image. It will generally be appreciated that the higher the ICC the higher the modulation depth. The modulation depth of a screen assembly provides a particularly useful measure for determining the performance of a screen and for comparing relative performance of different screens and screen elements. Under high levels of ambient light, both $I_{max}$ and $I_{min}$ are typically offset by the same amount. Consequently, the ICC is reduced, thus reducing the modulation depth. Therefore, the reduction of ambient light reflection is important for preserving high contrast and high resolution.

Figure 3A:
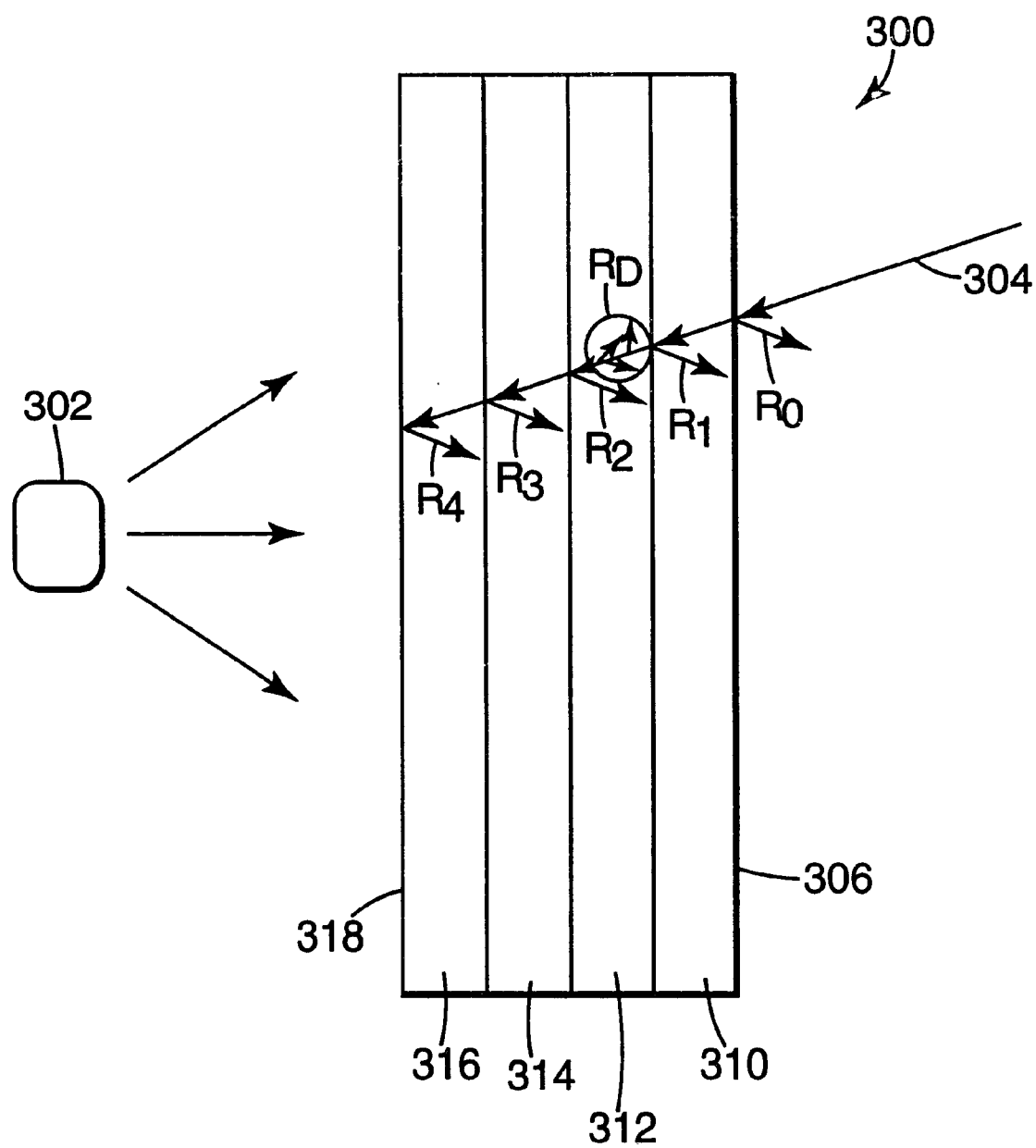
FIGS. 3A and 3B respectively illustrate diffuse reflection of ambient light and image light within a screen assembly.

Ambient light from the viewing side the screen may be diffusely reflected or specularly reflected. Specular reflection is commonly reduced by using an anti-reflection (AR) coating on screen surface, screen, or by a matte finish, or by a combination of the two. Specular reflection at the interfaces between different layers of a screen is commonly low because of index-matching between layers. Index-matching is, however, typically not perfect, and some specular reflection does occur. Furthermore, there is often a diffuse reflection, particularly where the screen includes a diffuse scattering layer. This is illustrated in FIG. 3, which shows a screen 300 in a back-illumination configuration, with an image projector 302 on an input side. Ambient light 304 is incident on the output side 306 of the a screen 300. The screen 300 includes a number of different layers, 310, 312, 314 and 316. A fraction, $R_0$, of the incident ambient light is reflected by the front surface 306 of the screen 300. Further fractions $R_1$, $R_2$, and $R_3$ are reflected at the interfaces between the first and second layers 310 and 312, the second and third layers 312 and 314, and the third and fourth layers 314 and 316 respectively. A fraction, $R_4$, of the remaining ambient light 300 is reflected off the input surface 318 of the fourth layer 316. Furthermore, a fraction, $R_D$, of the light is diffusely reflected light at one of the layers, typically a scattering layer. A substantial fraction of all the reflected light is transmitted back out of the screen 300 in the direction towards a viewer on the output side of the screen 300. This ambient light exiting from the screen reduces the contrast of the desired image, and therefore negatively affects the resolution. It is, therefore, important to reduce the amount of ambient light that is reflected within the screen 300 towards the viewer.

Figure 3B:
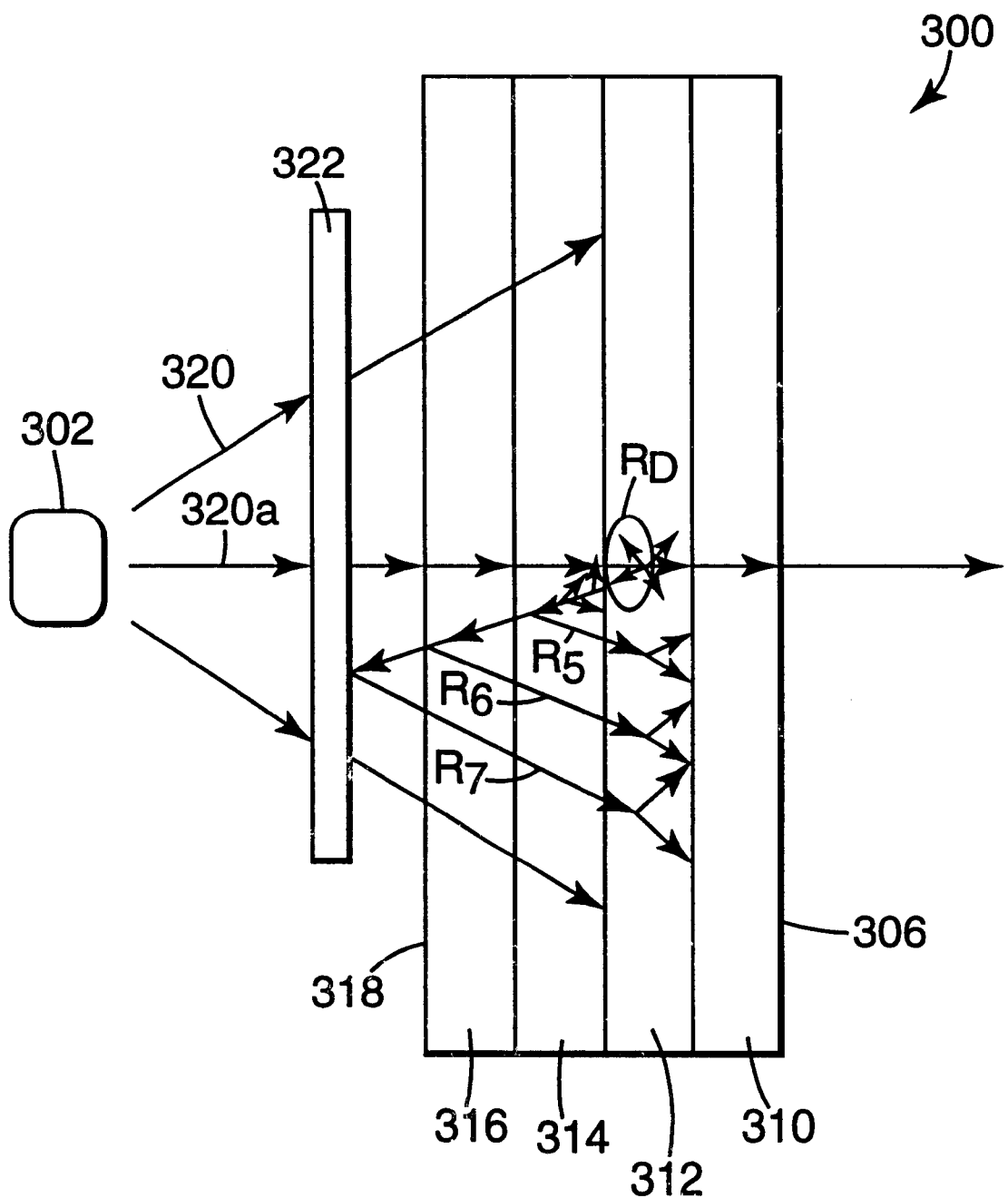

It should also be noted that image light 320, incident on the screen 300 from the image projector 302, may be partially reflected by the screen 300, for example as shown in FIG. 3B. The image light 320 may be specularly reflected at interfaces between the layers 310, 312, 314 and 316, as well as the input and output surfaces 318 and 306: for clarity, direct specular reflection is not shown in the figure. Specularly reflected light may give rise to ghost images seen by the viewer. The input surface 318 is often provided with a matte finish to reduce specular reflection.

Consider the on-axis light 320a. In addition to specular reflection, a fraction, $R_D$, of the on-axis light 320a is diffusely reflected in the second layer 312. The diffusely reflected light may be reflected back into the forwards direction, for example, by specular reflection at the interfaces between the third and fourth layers 314 and 316, shown as ray $R_5$, and the input surface 318, $R_6$. Furthermore, if there are any optical elements, generally illustrated as element 322, between the screen 300 and the image projector 302, such as transmission optics, folding mirrors, and the like, then there may be additional reflections, such as is shown as reflection $R_7$. Such reflections, $R_5$ $R_6$, and $R_7$, may give rise to a brighter background light level that increases the value of $I_{min}$. A higher background light level reduces the intercharacter contrast, ICC, thus reducing the modulation depth, MD. Consequently, the brighter background results in a reduction in the contrast and, therefore, also a reduction in the resolution. It should be appreciated that this discussion generally applies to all image light 320 incident on the screen 300. Therefore, it is also important to reduce the light reflected by the screen 300 back towards the image projector 302.

Figure 4A:
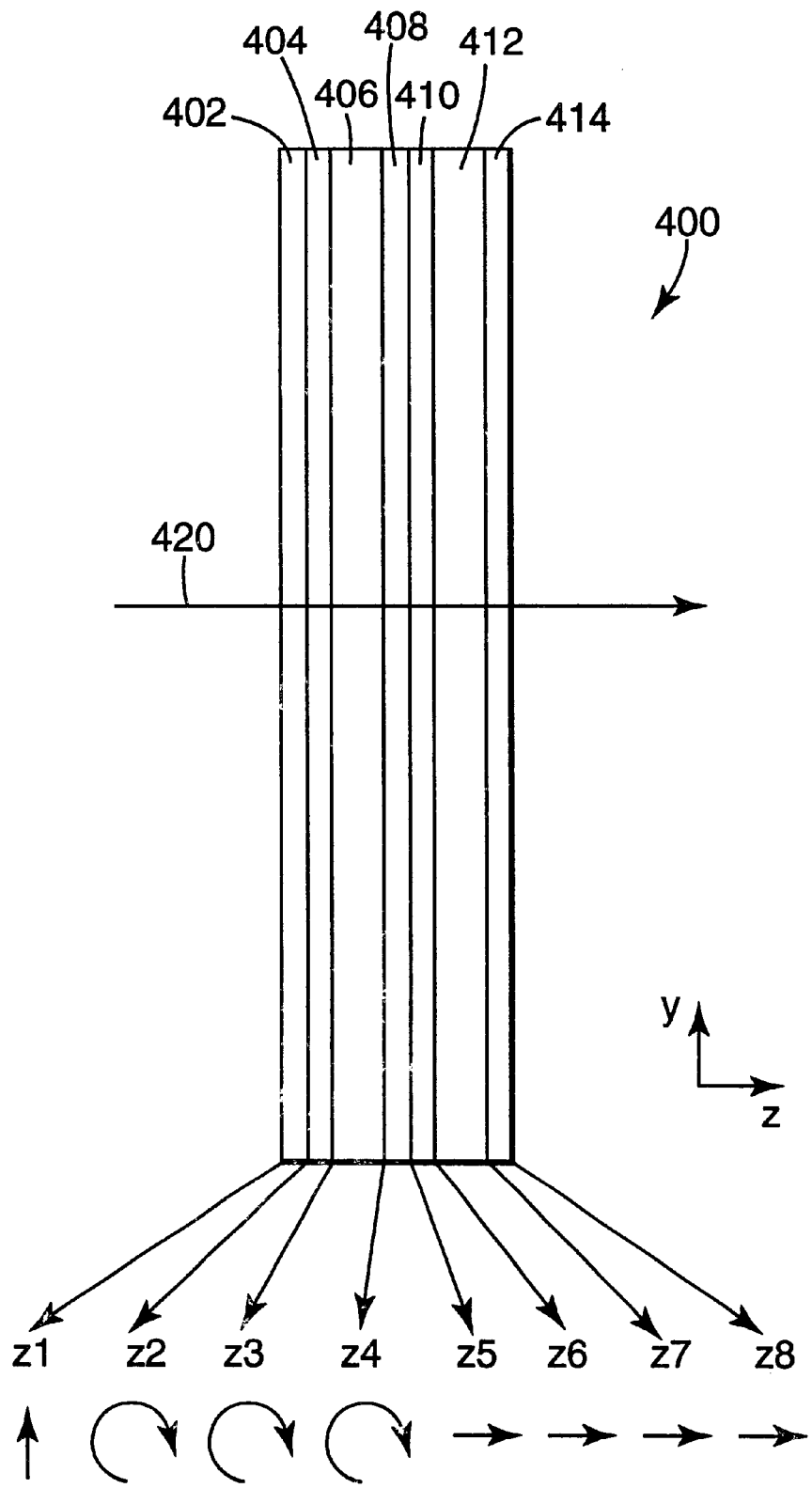
FIGS. 4A–4C illustrate a projection screen assembly in accordance with an embodiment of the invention.

A schematic cross section of one particular embodiment of a screen according the present invention is illustrated in FIG. 4A. The screen 400 includes several layers. The screen 400 is designed to operate as a back-projection screen, with light propagating through the screen in the direction shown by the arrow 420, from left to right. The first layer 402 is a polarization retarding layer. The second layer 404 is a dispersing layer, and is affixed to a dispersing layer substrate 406. The fourth layer 408 is a second polarization retarding layer and the fifth layer is a polarizer layer 410 affixed to a glass sheet 412. An AR layer 414 is disposed on the output side of the glass sheet 412. The glass sheet 412 may be clear, may have selected diffusive characteristics, or may have selected absorption characteristics, such as providing neutral density. It should be appreciated that one layer may be affixed to another in several different ways including, but not limited to, coating one layer over the other, laminating one layer on another, either with or without an adhesive layer therebetween, and the like.

The polarization retarding layers 402 and 408 are birefringent, in other words the refractive index is different for orthogonal polarization states. Accordingly, when a ray of mixed polarization propagates through a retarding layer, the phase relationship between the two polarization states is changed. For example, light entering the retarding layer with equal amplitudes of the two orthogonal polarization states in phase with each other is linearly polarized at an angle of 45° relative to the polarization axes of the retarder. However, after propagating through a certain thickness of the retarding layer, there is a phase delay between the two polarization states of π/2, and so the light becomes circularly polarized.

If the retarding layer has a thickness such that the phase delay between the two polarization states induced by the layer is π/2, then the layer is termed a quarter-wave polarization retarder. The retardation of the retarding layers 402 and 408 may be selected to accommodate different states of polarization incident on the screen. For example, the incident light 420 may be unpolarized, elliptically polarized, linearly polarized or circularly polarized. The retardation of the retarding layers is typically selected to control the polarization state of the light 420 so that it matches the pass polarization state of the polarizing layer 410 for maximal transmission.

Under certain circumstances, it may be possible for the screen 400 to use only the second retarding layer 408, and to omit the first retarding layer. For example, where the light 420 is incident on the screen 400 with circular polarization, and where the second retarding layer 408 is a quarter-wave retarder, the polarization of the light 420 may be converted to the linear polarization that is passed by the polarizing layer 410.

The retardation layers 402 and 408 may be formed from polymer sheets that are stretched to induce birefringence, with a thickness selected so that the sheet operates as a quarter-wave retarder for visible light. The retardation may be set at a quarter wave for a wavelength in the center of the visible portion of the spectrum, for example around 550 nm. Since the phase-velocity dispersion of the polymer material is typically small, the retardation imposed by the quarter-wave retarder is relatively uniform over the entire visible spectrum. The polymer retardation sheets may be formed from any suitable polymer, including polyacrylonitrile and methylacrylate or copolymers thereof, polyvinyl alcohol, polycarbonate, polyolefin and polystyrene. An acrylonitrile-based polymer is particularly useful as a wide-angle retarder, as is disclosed in U.S. Pat. No. 5,867,239 and incorporated herein by reference, because $n_y \sim n_z$ where $n_y$ is the refractive index of the retarder layer for light polarized in the y-direction and $n_z$ is the refractive index for light polarized in the z-direction. This termed a uniaxial material because the refractive index along one axis is the same as the refractive index along another axis. Biaxial materials, where the refractive indices along all three axes, x, y, and z, are different.

A common type of dispersing layer 404 is a bulk diffuser in which, typically, particles having a first refractive index are suspended within a material having a second refractive index. Other types of dispersing layers may be employed, such as a lenticular layer, a beaded layer, a surface diffusing layer, a holographic diffusing layer, or a micro-structured diffusing layer, or various combinations thereof A lenticular layer is a film having a series of lenticular lenses on one, or both, sides. A beaded layer has been described in parent U.S. patent application Ser. No. 09/095,835. Surface diffusing and micro-structured diffusing layers have surfaces specifically designed to diffuse light passing therethrough. A holographic diffusing layer may be a surface, or volume, hologram that diffuses light passing therethrough. As discussed above, the viewing angle resulting from the dispersing layer may or may not be symmetric.

The polarization state of light passing through the screen 400 is illustrated for different positions in the screen 400. The positions z1, z2, z3, z4, z5, z6, z7, and z8, are respectively at the input to the first quarter wave retarding film 402 (z1); between the quarter wave retarding film 402 and the dispersing film 404 (z2); between the dispersing film 404 and the dispersing layer substrate 406 (z3); between the dispersing layer substrate 406 and the second quarter-wave retarding film 408 (z4); between the quarter-wave retarding film 408 and the absorbing polarizer film 410 (z5); between the absorbing polarizer film 410 and the glass sheet 412 (z6); between the glass sheet 412 and the AR layer 414 (z7); and at the output surface of the AR layer 414 (z8). The various polarization states of the light beam 420 from the image projector are illustrated as if viewed in a direction through the screen 400 from left to right.

The screen operates in the following manner: light 420 from an image projector is typically linearly polarized, and is shown to be vertically polarized at position z1. The optical axis of the first quarter-wave retarder 402 is selected so that the polarized light from position z1 emerges from the retarder 402 with circular polarization, as shown for position z2, and is typically at ±45° relative to the direction of polarization of the light from the image projector. The dispersing layer 404 and the dispersing layer substrate 406 do not significantly affect the polarization, and so the polarization state of the light remains circular at positions z3 and z4. In this particular embodiment, the optical axes of the first and second retarding layers 402 and 408 are parallel so that the light 420 emerges from the second retarding layer 408 with a linear polarization perpendicular to the linear polarization at position z1, in this case horizontal polarization, in other words the two retarding layers 402 and 40 operate as a half-wave retarder that has rotated the direction of the polarization through 90°. The remaining layers, namely the linear polarizer 410, the glass layer 412 and the AR layer 414, do not substantially affect the polarization of the light, and the light 420 emerges from the screen at position z8 with horizontal polarization. The polarizer layer 410 is aligned with its transmission axis horizontal, i.e. parallel to the polarization direction of the light entering the polarizing layer 410 from the second quarter-wave retarding layer 408.

Figure 4B:
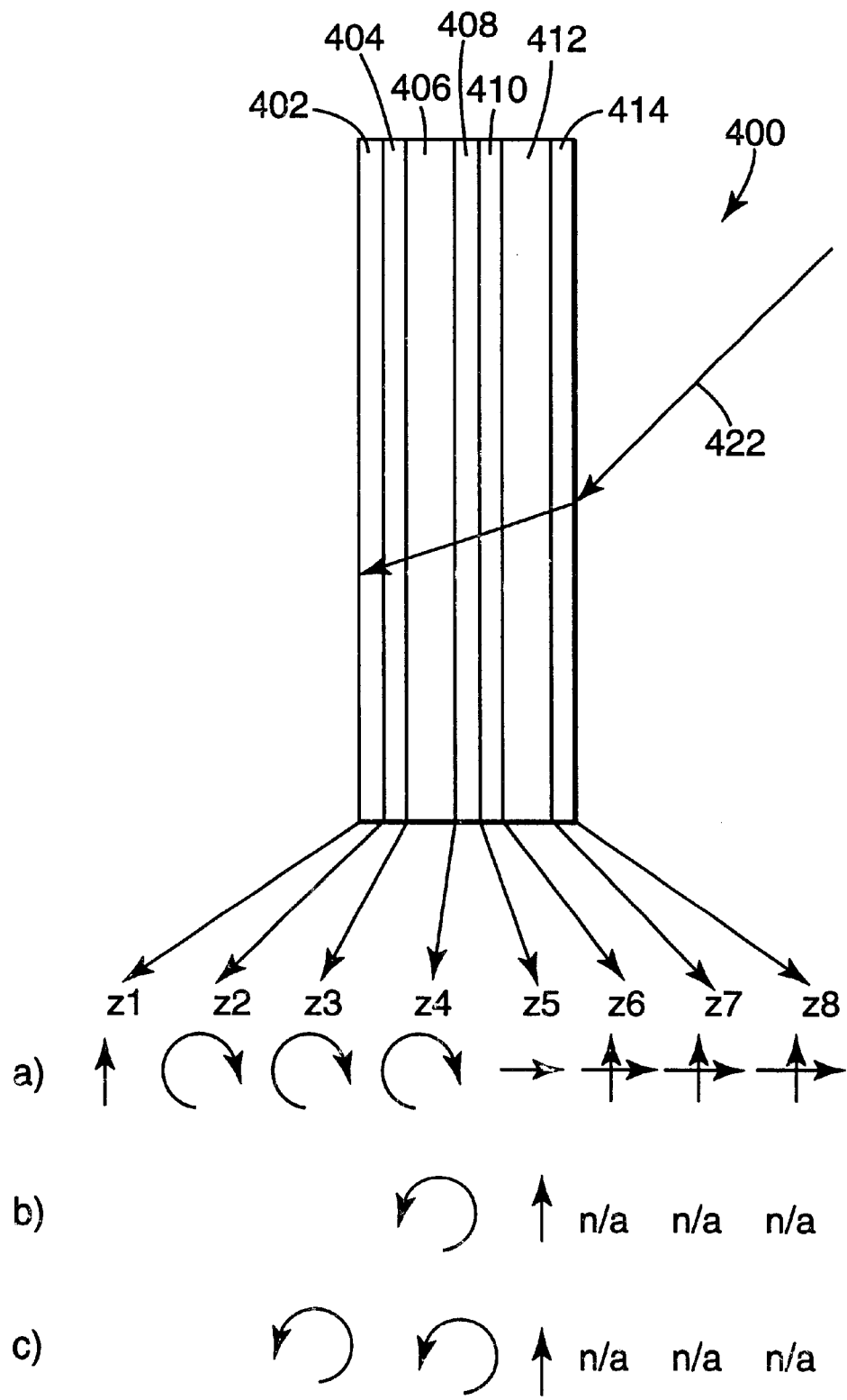

The structure of the screen 400 is effective at reducing the reflection of ambient light, as illustrated in FIG. 4B. Ambient light 422, incident from the right side of the screen 400, is typically unpolarized. The polarization state of the ambient light 422 passing in a reverse direction through the screen 400 is illustrated as line a). The ambient light 422 enters the screen 400 with a mixture of polarization states, shown at position z8 as a mixture of horizontal and vertical polarizations. The unpolarized ambient light passes through the AR coating 414 and the glass sheet 412 without any significant polarization changes, i.e. to position z6. The ambient light then passes through the polarizer 410, which absorbs the vertically polarized light, so that the light exiting the polarizer at position z5 is horizontally polarized. Therefore, half of the ambient light is absorbed. After passing through the second quarter-wave retarding film 408, the ambient light is circularly polarized, as shown at position z4. The ambient light remains circularly polarized after passing through the substrate 406 and the dispersing film 404, as shown for positions z3 and z2. Any ambient light that passes through the first quarter-wave retarding layer 402 emerges with vertical polarization, position z1.

Consider now ambient light reflected within the screen 400. Ambient light passing through the screen 400 at the interface at position z4 between the substrate 406 and the second quarter-wave retarding layer 408 is circularly polarized. Any ambient light reflected at the interface at z4 emerges from the second quarter-wave retarding layer, at position z5, with vertical polarization, i.e. the polarization state orthogonal to what was passed by the polarizer 410. This is shown in line b). Therefore, this reflected light is absorbed by the polarizer 410, and does not pass back out of the screen 400 towards the viewer. The symbol "n/a" indicates that there is no applicable polarization state to be shown, since the light was absorbed.

The polarization state of ambient light diffusely reflected between positions z3 and z2, in the dispersing layer 404, is illustrated at line c). The ambient light reaching the interface at position z3 is circularly polarized. Therefore, the reflected ambient light is also circularly polarized, and maintains circular polarization until it emerges from the second quarter-wave retarding layer 408, as vertically polarized light, at position z5. Light having this polarization state is absorbed by the polarizer 410. Therefore, the ambient light reflected from the interface at position z3 does not escape from the screen 400.

It will be appreciated that ambient light reflected from the interface at position z2 is likewise absorbed in the polarizer 410. Therefore, ambient light reflected within the screen 400 is absorbed by the polarizer 410, thus reducing the amount of ambient light reflected by the screen. This screen construction is effective at increasing the contrast, and therefore the resolution, of the screen.

Figure 4C:
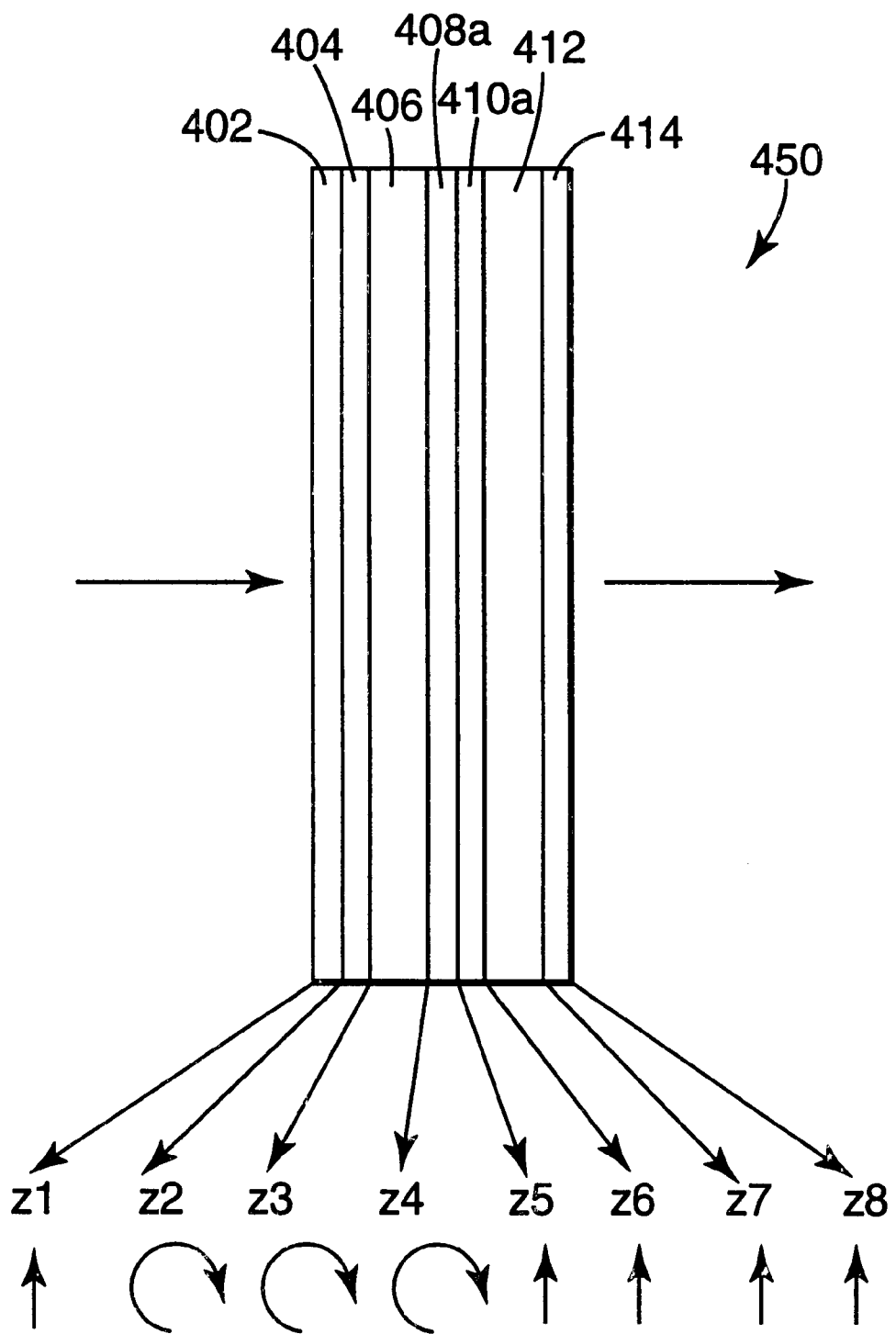

Another embodiment of a screen 450, similar in many respects to screen 400, is illustrated in FIG. 4C. The major difference between the screens 400 and 450 is that the second quarter-wave retarding layer 408a in the screen 450 has its optical axis perpendicular relative to the optical axis of the first quarter-wave retarding layer 402. Therefore, instead of the two quarter-wave retarding layers combining to rotate the polarization state of light passing through screen by 90°, as is the case with the previous screen 400, the net effect of passing through the two quarter-wave retarding layers 402 and 408a is no rotation of the polarization. Accordingly, for vertically polarized light entering the screen 450, as shown for position z1, the light emerging from the second quarter-wave retarding layer 408 also has vertical polarization. The polarizing layer 410a is oriented accordingly, to transmit vertically polarized light. The screen 450 absorbs reflected light in a manner similar to that described for the screen 400.

There are certain advantages to be gained by using a screen where retarding layers have crossed optical axes. For example, the polarization retardation effect of the quarter-wave retarding films 402 and 408 is somewhat dependent on the wavelength of the incident light. Therefore, the retarding layers 402 and 408 operate as perfect quarter-wave retarders for only a portion of light in the visible spectrum. The retarder is typically designed for light in the center of the visible spectrum, and so the retardation is commonly less than a perfect quarter-wave for light at the blue and red ends of the spectrum. By subtracting the effect of one retarder layer form the other, the wavelength dependence of the retardation is cancelled out. On the other hand, if the retarder layers have parallel optical axes, then the combined effect of the two retarder layers is additive, resulting in a color-shift of the light passing through the screen. Furthermore, where the effect of the retarder layers is subtractive, there is a greater tolerance for imperfections in the film. Where the effect of the retarder layers is additive, the performance of the retarder layers needs to be very high, demonstrating the same retardance over the range wavelengths and incident angles experienced by the retarder. Furthermore, the retardance of the two retarding layers has to be matched to produce a perfect half-wave retardance, otherwise there is a color shift in the transmitted light and the level of transmitted light is reduced from the optimum.

The retardation imposed on light passing through the retarding layer is dependent not only on the material birefringence, but also on the path length within the retarding layer. Therefore, the amount of retardation varies with the angle at which light passes through the retarding layer. The retarding layer is typically designed for light passing therethrough at normal incidence. Light that has been scattered by the dispersing layer passes through the retarding layer at a non-normal angle and may be retarded by a non-optimal amount. However, the acrylonitrile-based wide-angle retarding layer, as disclosed in U.S. Pat. No. 5,867,239, is particularly suited to this application, since the off-axis effect is reduced.

Therefore, the quarter-wave retarding layers may exhibit wavelength and angle effects, resulting in color effects which reduce screen performance. These effects may be reduced, for example, by using collimated light to reduce the angle effect and using zero-order retarding layers of low dispersion material to increase the wavelength range over which the retarding layer is an effective quarter-wave retarder.

Wavelength and angle effects may be further reduced using the screen 450 illustrated in FIG. 4C. In this case, since the optical axes of the retarding layers 402 and 408a are crossed, the wavelength and angle effects of one retarding layer cancel the effects of the other retarding layer, thus reducing the overall wavelength and angle effect of the screen 450. This contrasts with the screen 400 where the wavelength and angle effects of the retarding layers 402 and 408 are additive. Accordingly, the relative orientation of retarding layers 402 and 408a in screen 450 provides an advantage in reducing wavelength and angle effects.

It should be appreciated that the light projected on the screen assembly by the image projector need not be linearly polarized. In such a case, the screen assembly is adapted to receive the image light received from the image projector and to convert the polarization state to the state that is transmitted through the polarizer layer. This may require the use of only a single retardation layer. For example, if the image projector transmits circularly polarized light, there is no retarder layer between the dispersing layer and the image projector, and the dispersing layer transmits the circularly polarized light to a retarding layer located between the dispersing layer and the polarizing layer. The retarding layer converts the polarization state of the image light into the polarization state that is transmitted by the polarizing layer. Accordingly, such a screen assembly only requires a single retarding layer, positioned between the dispersing layer and the polarizer layer, while still effectively reducing the amount of ambient light that is diffusely reflected.

Figure 5:
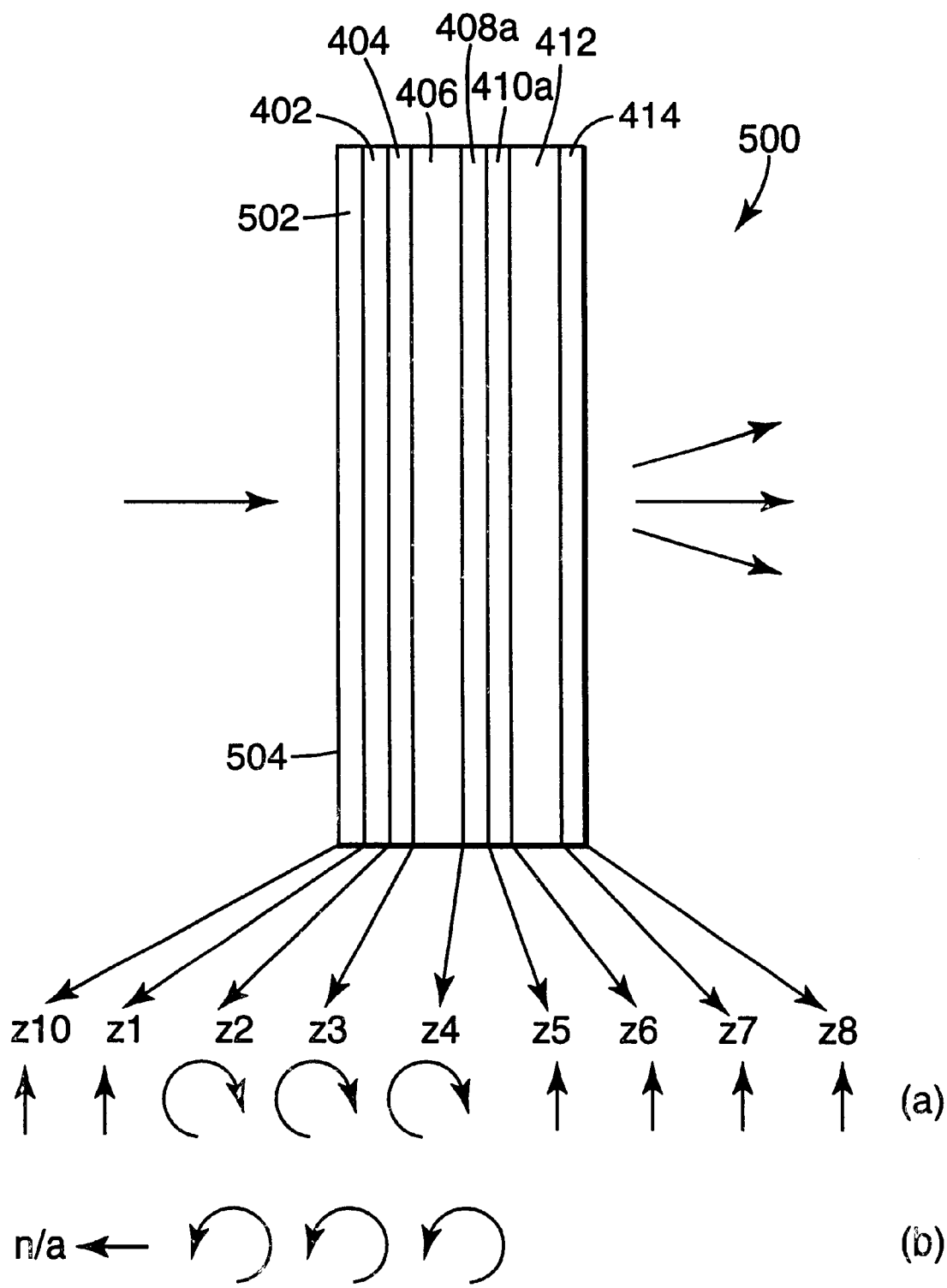
FIG. 5 illustrates a projection screen assembly in accordance with another embodiment of the invention.

Another embodiment of a screen according to the present invention is illustrated in FIG. 5. The elements of screen 500 that are similar to those of screen 450 are identified with similar numbers. In this embodiment, the screen 500 has a polarizing layer 502 on an input side 504. Polarization states for light passing through the screen in the forward direction from an image projector to a viewer are illustrated for positions z1–z8 and z10, on the line marked (a). The position z10 is the input face of the first polarizer 502. The positions z1–z8 are as before. The polarizer layers 502 and 410a are oriented to be parallel, i.e. the transmitted polarization directions for the polarizer layers are parallel, and the optical axes of the quarter-wave retarding layers 402 and 408 aligned accordingly to permit transmission of the light from the image projector. The light incident on the screen 500 from the image projector is typically linearly polarized in a direction parallel to the transmission polarization for the polarizing layers 410a and 502, and so the addition of the first polarizing layer 502 does not affect the transmission of image light through the screen 500.

The first polarizing layer 502 is useful in reducing the level of image light reflected (either diffusely of specularly) back towards the light source. For example, consider reflection of forward travelling (left to right) light at the interface, at position z4, between the substrate 406 and the second quarter-wave retarding layer 408 a. The polarization state of the reflected light is shown in line (b). The reflected light returns through the substrate layer 406 and the dispersing layer 404 to the first quarter-wave retarding layer 402 with circular polarization. When it emerges from the quarter-wave retarding layer 402, at position z1, the light is linearly polarized in a direction orthogonal to the transmission direction of the first polarizing layer 502, and is absorbed. Therefore, the first polarizer 502 may be used to reduce the amount of image light that is reflected back to the image projector. This may be particularly useful in a folded projection system where a folding mirror is placed close to the input face 504 of the screen 500. Without the first polarizer 502, light diffusely reflected within screen may reflect off the mirror back onto the input face 504 of the screen 500, and be transmitted towards the viewer. Light reflected in this manner constitutes a diffuse background level that reduces screen contrast, and can therefore have a deleterious effect on resolution. The polarizing layer 502 reduces the amount of diffusely reflected light, thus enhancing contrast, and maintaining high resolution. This screen is also effective at reducing the reflection of ambient light from the viewing side, as described above for screens 400 and 450.

Figure 6:
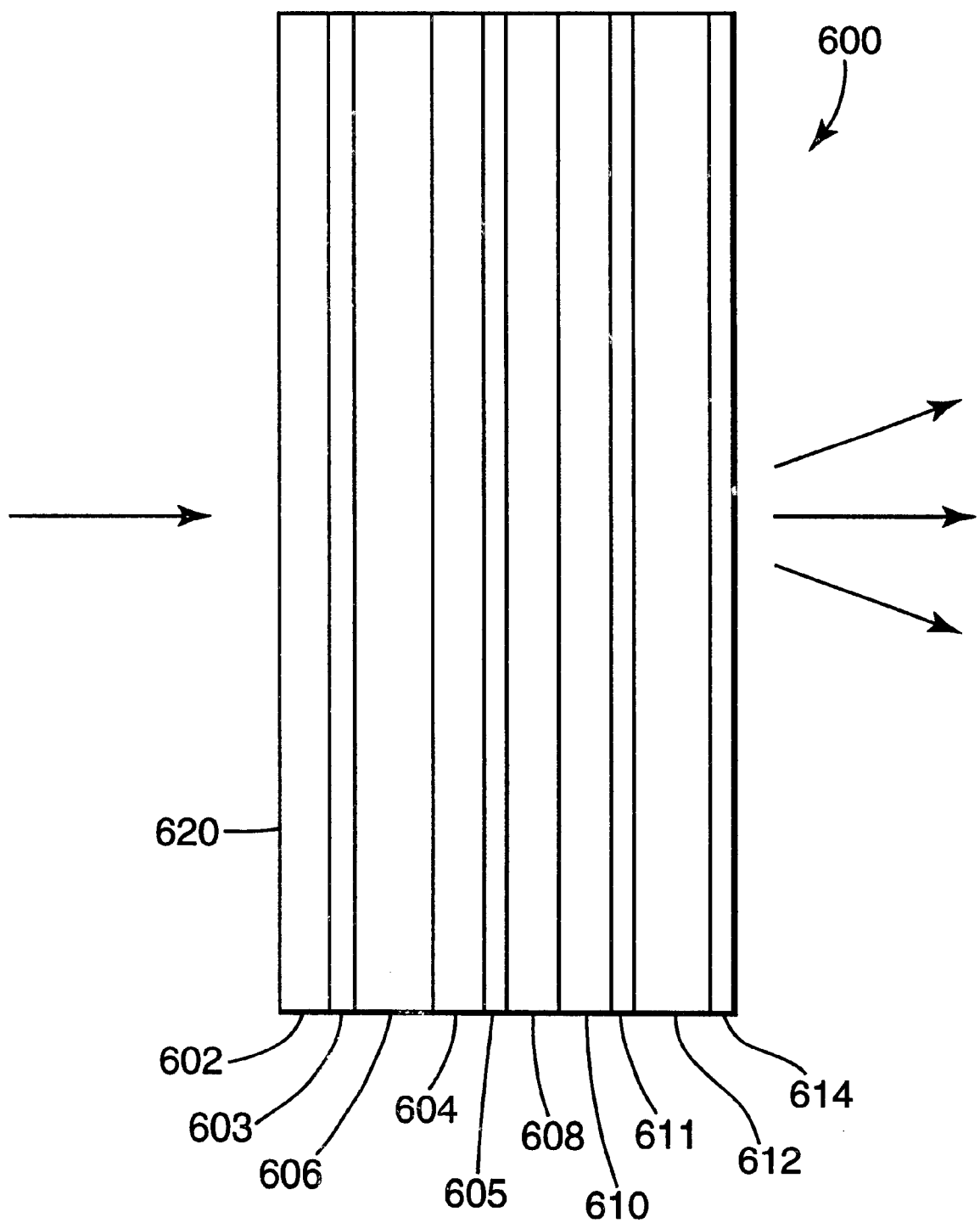
FIG. 6 illustrates a projection screen assembly in accordance with still another embodiment of the invention.

Another embodiment of screen according to the present invention is illustrated in FIG. 6. The quarter-wave retarding layers 602 and 608, the dispersing layer 604, the dispersing layer substrate 606, the absorbing polarizer 610, the glass sheet 612 and the AR layer 614 are similar to those described above. The first quarter-wave retarding layer 602 is laminated to the dispersing layer substrate 606 via a first layer of optical adhesive 603. In this embodiment, a dispersing layer substrate 606 faces the input side 620 of the screen assembly 600. In comparison with FIG. 5, the positioning of the dispersing layer 604 and the dispersing layer substrate 606 is reversed.

In all of the embodiments illustrated herein, it may be desirable that the input surface, i.e. the surface onto which an image is projected, be treated to reduce specular surface reflections. In the present embodiment, the input surface 620 may be treated to have a matte texture that tends to reduce specular reflection. In another embodiment, an AR coating may be applied to the input surface 620 as an alternative or additional way to reduce specular reflections of image light projected onto input surface 620 of the screen assembly 600.

Figure 7:
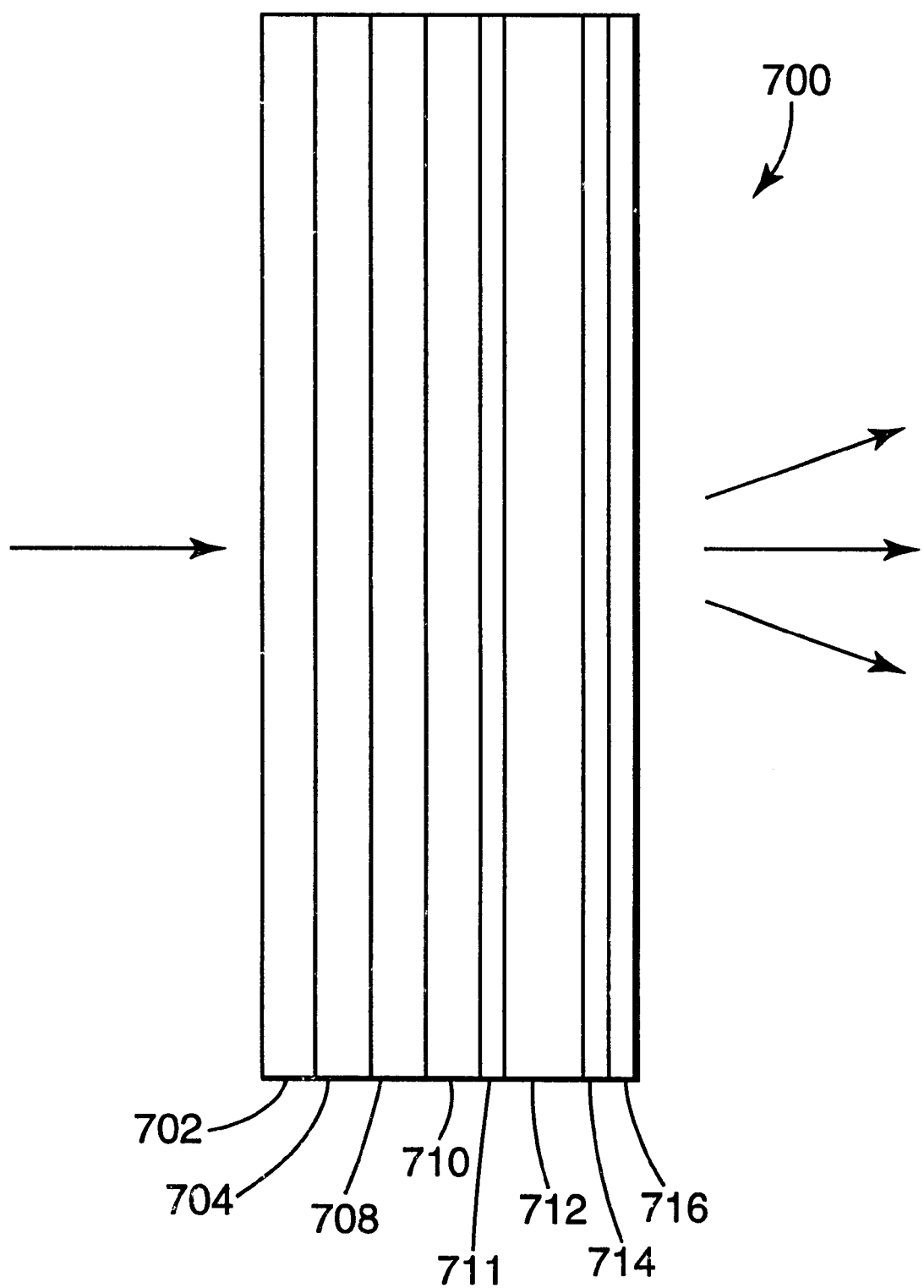
FIG. 7 illustrates a projection screen assembly in accordance with yet another embodiment of the invention.

Another embodiment of a screen assembly is depicted in FIG. 7. The screen assembly 700 includes quarter-wave retarding layers 702 and 708, a dispersing layer 704, a polarizing layer 710, a glass sheet 712 and an AR layer 714. The second quarter-wave retarding layer may be attached, for example by lamination, to a polarizing layer 710, and the combination of quarter-wave retarding layer 708 and polarizing layer 710 used as a substrate onto which the dispersing layer 706 is coated and subsequently cured. The polarizing layer 710 may then be attached to other elements of a screen assembly, for example the glass sheet 712 via a layer of optical adhesive 711. The glass sheet 712 may be provided with an AR layer 714 and an anti-smudge coating 716. The first quarter-wave retarding layer 702 may be laminated directly over the dispersing layer 704.

One particular advantage of this screen assembly 700 is the elimination of a separate dispersing layer substrate to support the dispersing layer 704. Elimination of the separate diffuser substrate eliminates any degradation in performance due to, for example, birefringence of the diffuser substrate.

In an alternative embodiment, the screen assembly 700 may be made by first coating the dispersing layer 704 onto a transfer substrate (not shown) and curing the dispersing layer 704. The surface of the cured dispersing layer 706 opposite the transfer substrate may then be laminated to the second quarter-wave retarding layer 708 via an adhesive (not shown). Upon removal of the transfer substrate, the first quarter-wave retarding layer may be laminated over the dispersing layer 704, either with or without a layer of optical adhesive therebetween. A screen assembly which does not incorporate a separate dispersing layer substrate is obtained. The transfer substrate may have a structured surface, for example a microstructured, embossed surface on which the dispersing layer 704 is formed. The structured surface of the transfer substrate imparts a complementary structured finish to the dispersing layer 704 upon removal of the transfer substrate.

Still another embodiment of the invention is illustrated in FIG. 8. A dispersing layer 804 is laminated to an quarter-wave retarding layer 808 via a diffusing adhesive 805. The diffusing adhesive 805 provides additional dispersion to the image light passing through the screen assembly 800, which may permit the thickness of the dispersing layer 804 to be reduced while obtaining the same overall level of dispersion. This may permit reduction in the thickness of the complete screen assembly 800. The first quarter-wave retarding layer 802 and the polarizing layer 810 are subsequently laminated on the respective surfaces of the dispersing layer 804 and the second quarter-wave retarding layer 808.

It will be appreciated that while other optional elements of a screen assembly are not illustrated in FIG. 8, they may also be provided as desired for the purposes described above. For example, the dispersing layer 804 may be laminated to a dispersing layer substrate (not shown) and the substrate laminated to the quarter-wave retarding layer 808 via the diffusing adhesive 805. When a diffusing adhesive 805 is used, its dispersing characteristics should be compatible with the dispersing characteristics of the dispersing layer 804. For example, the diffusing adhesive 805 should not substantially depolarize light. One such diffusing adhesive is described in published PCT Patent Application WO 97/01610, entitled Light Diffusing Adhesive, the contents of which are incorporated herein by reference.

Another screen assembly 900 is illustrated in FIG. 9 in accordance with another embodiment of the invention. The screen assembly 900 includes a first quarter-wave retarding layer 902, a dispersing layer 904, a second quarter-wave retarding layer 908 and a polarizing layer 910. The different layers may be laminated together using an adhesive (not shown). Additional screen elements may be provided in conjunction with the screen elements depicted. It is also noted that a no dispersing layer substrate is shown. While a substrate could be used, in one embodiment the dispersing layer 904 may be coated directly onto one of the quarter-wave retarding films 902, 908 which would then also function as the dispersing layer substrate. The acrylonitrile-based retarder layer disclosed in U.S. Pat. No. 5,867,239 may be directly laminated on, or otherwise contacted to, a dispersing layer.

Another screen assembly 1000 is illustrated in FIG. 10 in accordance with another embodiment of the invention. The screen assembly 1000 includes a first polarizing layer 1002, a first quarter-wave retarding layer 1003, a dispersing layer 1004, a second quarter-wave retarding layer 1008 and a polarizing layer 1010. The different layers of the screen assembly 1000 may be laminated together using an adhesive (not shown). Additional screen elements may be provided in conjunction with the screen elements depicted.

Figure 11:
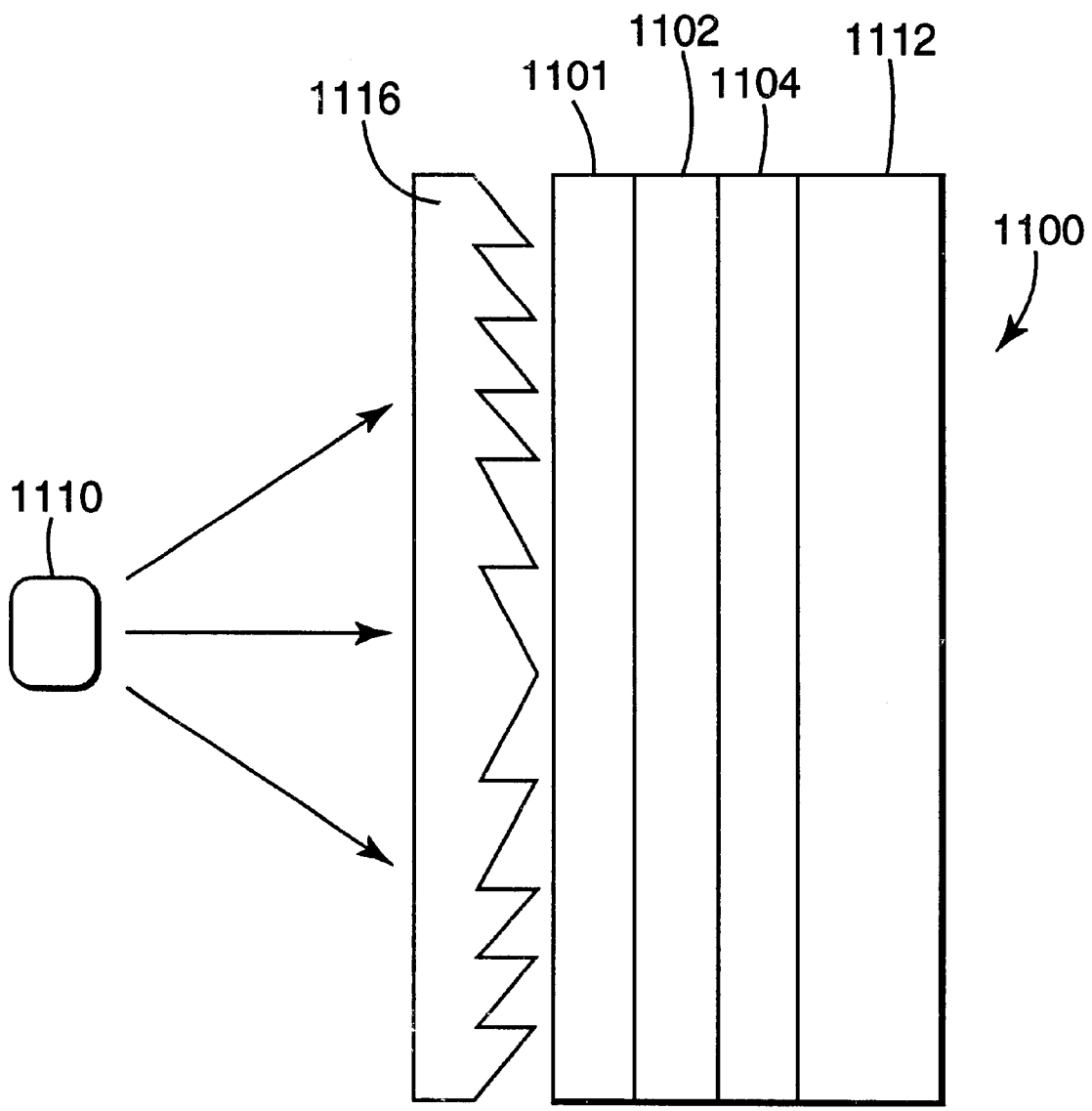
FIG. 11 illustrates a projection screen assembly in accordance with another embodiment of the invention.

Another screen assembly 1100 is illustrated in FIG. 11 in accordance with another embodiment of the invention. The screen assembly 1100 includes a first polarizing layer 1101, a quarter-wave retarding layer 1102, a dispersing layer 1104 and a glass sheet 1112. This construction is particularly useful for reducing the amount of image light diffusely reflected by the screen assembly 1100 back towards the image projector 1110. The different layers of the screen assembly 1100 may be laminated using one or more adhesive layers (not shown).

A focussing element 1116, such as a Fresnel lens, may be used in conjunction with the screen assembly 1100 to change the divergence of light passing into the screen assembly 1100 from the image projector 1110. The focussing element 1116 may collimate the image, or may alter the divergence of the image received from the image projector 1110 in some other way, for example by reducing, but not completely eliminating, the divergence. Any light rays passing through the first retarding layer in a non-normal direction are retarded by an amount different from those rays that pass through in a normal direction. Collimation by a Fresnel lens may direct the light rays to be more parallel to the normal direction, thus reducing the non-uniformity of retardation for different light rays across the screen assembly 1100.

Figure 12:
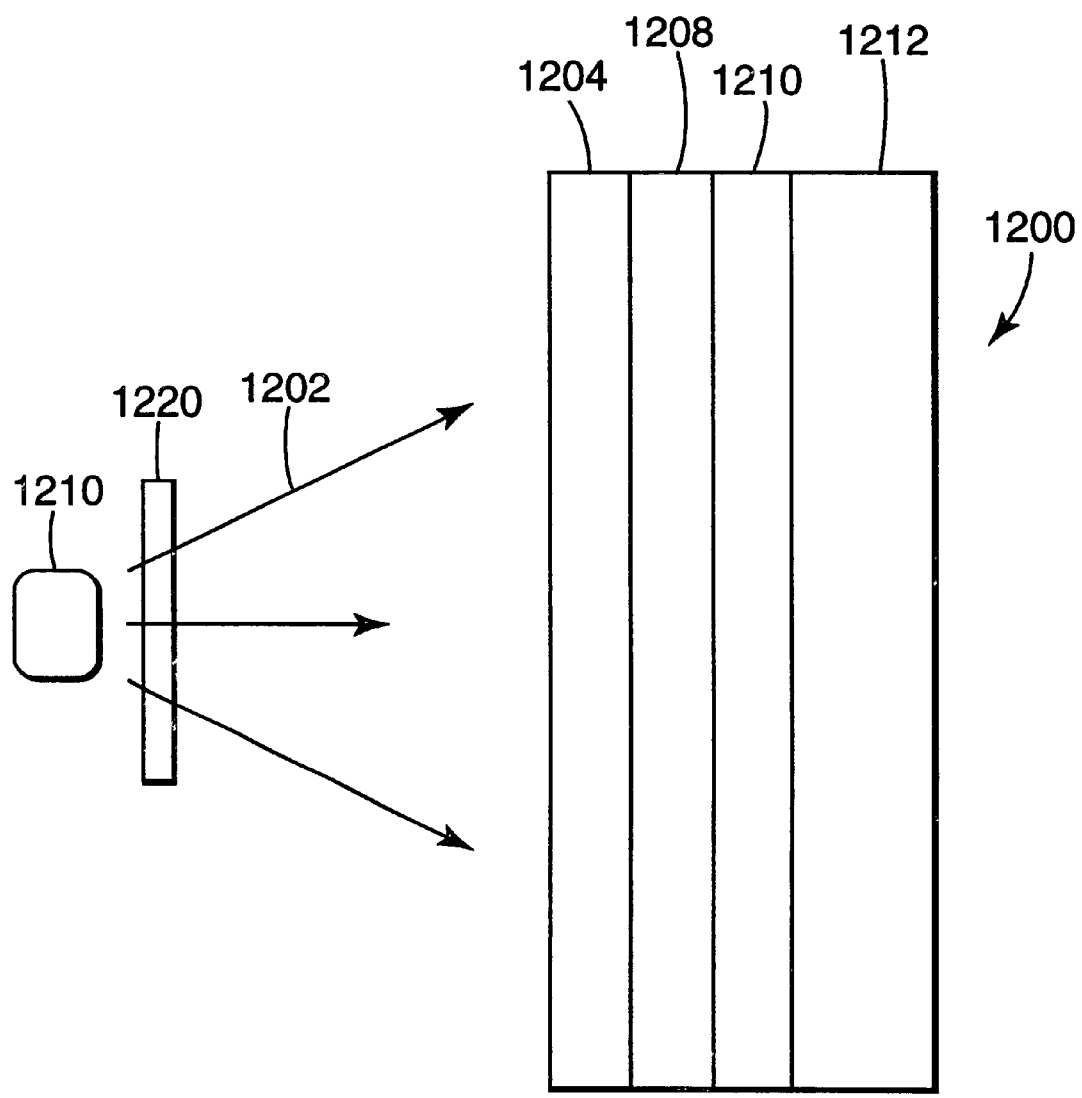
FIG. 12 illustrates a projection screen assembly in accordance with another embodiment of the invention.

Another embodiment of a screen assembly 1200 is illustrated schematically in FIG. 12. The image projector 1210 directs polarized light 1202 to the screen assembly 1200 which includes a dispersing layer 1204, a retarding layer 1208, a polarizing layer 1210 and a glass sheet 1212 for support. The light 1202 incident on the screen assembly 1200 has a first polarization state selected so that, after transmission through the retarding layer 1208, the light 1202 has a second polarization state that is passed by the polarizing layer 1210. The degree of retardation of the retarding layer may be any useful value.

For example, the first polarization state may be circular polarization and the retarding layer 1208 may be a quarter-wave retarder. The image projector 1210 may project circularly polarized light itself or may project light having some other polarization state that is subsequently converted by a retarder 1220, positioned between the image projector and the screen assembly 1200, to circular polarization. Advantages of this embodiment include a reduction in the number of layers in the screen assembly 1200 and the possibility of using a retarder 1220 that is smaller than a retarder included on an input side of a screen assembly, for example as in screen assembly 400.

The projection screen assemblies need not be configured exactly as shown above. For example, a screen assembly having quarter-wave retarding layers on either side of the dispersing layer, and polarizing layers outside the quarter-wave retarding layers, may be assembled so that the transmission axes of the polarization layers are crossed, rather than being parallel as suggested above. It should be appreciated that the optical axes of the retarding layers would be oriented accordingly to permit transmission of the projected image through the screen assembly. It should further be appreciated that other layers, for example whose principle purpose is to increase the manufacturability or to provide support to the screen assembly, may be included in the screen assembly. Furthermore, where the incoming image light is not linearly polarized, but is elliptically polarized, the retarding layers may be set to have degrees of bireffingence such that the light transmitted by the polarizer on output side of the dispersing layer transmits a maximal amount of light. The retarding layers need not be quarter-wave retarders, but may have some other value of birefringence, even if the incoming light from the image projector is linearly polarized.

Different screen assemblies, according to the present invention, are described below along with some measured screen characteristics. These examples demonstrate how overall screen performance can be improved by using a combination of quarter-wave retarders and polarizing layers to reduce diffuse reflection of ambient and image light, and thus increase contrast and resolution. The examples also illustrate advantages provided by retarding layers having crossed optical axes. The first set of samples (2 and 3) illustrate screens generally of the type illustrated in FIGS. 4A–4C, having a single polarizing layer on the output side of the dispersing layer. The second set of samples (4–12) illustrate screens generally of the type illustrated in FIG. 5, having two polarizing layers.

Sample 1

Sample 1 was a screen assembly that included, in sequence a bulk diffuser layer, a diffuser substrate, a linear polarizing layer, a sheet of clear glass and an anti-reflection coating on the output side of the glass sheet. Sample I was used as a control reference. The diffuser layer was made from particles having an average diameter of approximately 5 $\mu$m and a refractive index of 1.54, 25% by weight, in a layer of acrylate, refractive index 1.47, approximately 260 $\mu$m thick. The diffuser substrate was a 175 $\mu$m thick layer of polycarbonate. The polarizing layers were type HNT 42 absorbing polarizer sheets, 175 $\mu$m thick, obtainable from Polaroid Corp. The layers were laminated using a non-birefringent optical adhesive.

Sample 2

Sample 2 included a construction similar to that shown in FIGS. 4A and 4B, and included the following layers in turn: a first quarter-wave retarding layer, a dispersing layer, a dispersing layer substrate, a second quarter-wave retarding layer, a polarizing layer, and a sheet of clear glass having an AR coating on the output surface. The polarizing layer was the same HNT 42 absorbing polarizer sheets as used in Sample 1. The quarter-wave retarding layers were made from BAREX®, an acrylonitrile-methyl acrylate copolymer, and were optimized for quarter wave retardation at approximately 555 nm. The optical axes of the retarding layers were parallel and the transmission polarizations of the polarizing sheets were perpendicular. The input surface of the first polarizing layer had a matte finish to reduce specular reflectance.

Sample 3

Sample 3 was the same as Sample 2, except that the optical axes of the retarding layers were approximately perpendicular, and the transmission polarizations of the polarizing sheets were parallel.

Sample 4

Sample 4 included a construction similar to that shown in FIG. 5, and included the following layers in turn: a polarizing layer, a first quarter-wave retarding layer, a dispersing layer, a dispersing layer substrate, a second quarter-wave retarding layer, a polarizing layer, and a sheet of clear glass having an AR coating on the output surface. The primary difference between Sample 4 and Sample 2 was the inclusion of a polarizing layer on the input side of the screen sample. The polarizing layers were the same HNT 42 absorbing polarizer sheets as used in Sample 1. The quarter-wave retarding layers were made from BAREX®, an acrylonitrile-methyl acrylate copolymer, and were optimized for quarter wave retardation at approximately 555 nm. The optical axes of the retarding layers were parallel and the transmission polarizations of the polarizing sheets were perpendicular. The input surface of the first polarizing layer has a matte finish to reduce specular reflectance.

Sample 5

Sample 5 was the same as Sample 4, except that the optical axes of the retarding layers were approximately perpendicular, and the transmission polarizations of the polarizing sheets were parallel.

Sample 6

Sample 6 was the same as Sample 4, except that the retarding layers were optimized for quarter-wave retardation at approximately 450 nm.

Sample 7

Sample 7 was the same as Sample 6 except that the optical axes of the retarding layers were crossed, approximately perpendicular, and the transmission polarizations of the polarizing sheets were parallel.

Sample 8

Sample 8 was the same as Sample 4, except that the retarding layers were thinner than the retarding layers in Sample 4.

Sample 9

Sample 9 was the same as Sample 8 except that the optical axes of the retarding layers were crossed, approximately perpendicular, and the transmission polarizations of the polarizing sheets were parallel.

Sample 10

Sample 10 was the same as Sample 4, except that the retarding layers were thicker than the retarding layers in Sample 4, and were optimized for quarter-wave retardation at a wavelength between 550 nm and 700 nm.

Sample 11

Sample 11 was the same as Sample 10 except that the optical axes of the retarding layers were crossed, approximately perpendicular, and the transmission polarizations of the polarizing sheets were parallel.

In all samples, the different layers were laminated together using a non-birefringent optical adhesive. Table I summarizes characteristic properties of the different samples.

The term $d*\Delta n$ relates to the wavelength-dependent degree of retardation of the retarding layers, and is the product of the retarding layer thickness, $d$, and the birefringence, $\Delta n(\lambda) = n_x(\lambda) - n_y(\lambda)$, where $\lambda$ is the particular wavelength, and $n_x$ and $n_y$ are the indices of refraction for the orthogonal polarization states. The $d*\Delta n$ product is presented for three different wavelengths, 450 nm, 550 nm and 700 nm. For quarter-wave retardation at a particular wavelength, the $d*\Delta n$ product is equal to one quarter of the wavelength. Therefore, for quarter-wave retardation at $\lambda=450$ nm, $d*\Delta n=112.5$ nm; at $\lambda=550$ nm, $d*\Delta n=137.5$ nm; and at 700 nm, $d*\Delta n=175$ nm. Those values presented in the table represent the actual film retardation values in nm at each of the wavelengths given. Samples 4 and 5, having a retardation of $d*\Delta n=138.8$ nm, were optimized for quarter-wave retardation at approximately 550 nm. Samples 6 and 7, having a retardation of $d*\Delta n =112.4$ nm were optimized for quarter-wave retardation at approximately 450 nm. Samples 8 and 9 had a retardation of $d*\Delta n=107.9$ nm, which is slightly less than the optimum of 112.5 nm for a wavelength of 450 nm. Samples 10 and 11 had a retardation of $d*\Delta n= 145.5$ nm at a wavelength of 700 nm, which was less than the optimum quarter-wave retardation of 175 nm, but showed a retardation of 1.68.4 nm at a wavelength of 550 nm, which was higher than the optimum quarter-wave retardation of 137.5 nm. Accordingly, the optimum wavelength for quarter-wave retardation of Samples 10 and 11 was between 550 nm and 700 nm.

TABLE I

Screen Assembly Characteristics

| Sample No | d* Δn | | | PG | VA Hor | VA Ver | % Ref | | Δu' × $10^{-4}$ | Δv' × $10^{-4}$ | ΔMD × $10^{-3}$ |
| | 450 nm | 550 nm | 700 nm | | | | S | V | | | |
|---|---|---|---|---|---|---|---|---|---|---|---|
| 1 | — | — | — | 0.85 | 52 | 51 | 9.55 | 4.26 | −19 | −125 | 0 |
| 2 | 152.8 | 138.8 | 133.4 | 0.80 | 47 | 46 | 6.51 | 3.62 | −21 | 225 | 39 |
| 3 | 152.8 | 138.8 | 133.4 | 0.82 | 50 | 45 | 5.80 | 3.50 | 15 | 118 | 132 |
| 4 | 152.8 | 138.8 | 133.4 | 0.73 | 43 | 49 | 2.63 | 1.87 | 2 | −305 | 51 |
| 5 | 152.8 | 138.8 | 133.4 | 0.75 | 51 | 45 | 2.91 | 2.20 | −7 | −148 | 130 |
| 6 | 112.4 | 103.5 | 97.9 | 0.61 | 45 | 47 | 2.45 | 1.77 | 133 | −47 | 176 |
| 7 | 112.4 | 103.5 | 97.9 | 0.75 | 46 | 48 | 2.63 | 2.16 | 1 | −156 | 163 |
| 8 | 107.9 | 97.9 | 91.7 | 0.53 | 47 | 44 | 2.20 | 1.60 | 155 | −1 | 54 |
| 9 | 107.9 | 97.9 | 91.7 | 0.79 | 47 | 44 | 2.66 | 2.18 | −9 | −138 | 140 |
| 10 | 181.5 | 168.4 | 145.5 | 0.67 | 46 | 49 | 2.55 | 1.69 | −192 | −516 | 32 |
| 11 | 181.5 | 168.4 | 145.5 | 0.76 | 46 | 48 | 2.76 | 1.93 | −2 | −125 | 56 |

The peak, on-axis gain of a film is presented in the column labeled "PG". The viewing angle, "VA" is presented for each film in the horizontal direction, "Hor" and the vertical direction, "Ver". The reflectivity is presented as a percent value for both surfaces of the screen, the source, or input, side, "S", and the viewing, or output, side, "V".

The color shift of the films is described in the next two columns, labeled Δu' and Δv'. The light source used for the measurements was a D65 source, having color co-ordinates u'=0.19766 and v'=0.46857. The columns labeled Δu' and Δv' show the changes in the color co-ordinates of the light after passing through the films. The increase in the modulation depth, MD is shown in the last column, labeled ΔMD.

Consider first the peak gain. The peak gain of the control film, Sample 1, was 0.85, while the peak gain of the other samples was somewhat less, since they each included an additional polarizer layer, which has a transmission of approximately 90%. In general, the films with retarding layers having crossed optical axes, Samples 3, 5, 7, 9, and 11, had higher peak gain than those whose retarding films had parallel optical axes, Samples 2, 4, 6, 8 and 10. One reason for this is that for those films where the optical axes are crossed, i.e. samples 3, 5, 7, 9, and 11, the effects of one retarder subtract from the other, thus canceling out any deficiency in the retarders. However, in Samples 2, 4, 6, 8, and 10 the polarizers are perpendicular, which requires that the polarization of light passing through the first polarizer must be rotated through 90° to pass through the second polarizer. Any portion of the light passing through the first polarizer whose polarization is not rotated by exactly 90° is absorbed in the second polarizer. As can be seen by the film retardation values presented for the different wavelengths, the retardation films are not perfect quarter-wave retarders across the visible spectrum. The effect of this imperfection is reduced by using retarders with crossed optical axes.

Next, consider the reflectivity. The reflectivity of the input surface of the reference screen, Sample 1, is 9.55%, while the reflectivity of the output surface is 4.26%. These values are primarily due to diffuse reflection by the bulk diffuser. The reflectivity is higher on the input (source) side of the reference screen, because the measurements made on the source side of the screen were made with polarized light, to emulate actual illumination of the screen with a polarized image source, whereas the measurements made on the output (viewing) side of the screen were made with unpolarized light to emulate unpolarized ambient room light. The polarizer on the output side of the screen reduced the amount of ambient light reaching the diffuser by about 50%: there was no such reduction of light reaching the diffuser from the input side, since Sample 1 had no polarizer on the input side, and diffuser was illuminated directly.

The reflectivities of both sides of Samples 2–11 are significantly smaller than for the reference Sample 1. As with Sample 1, the reflectivity from the source side was measured with polarized light, oriented to the pass polarization direction for the first polarizer, and with unpolarized light from the viewer side. The reflectivity of Samples 4–11 (having two polarizing layers) is around 2–3% total for most of the samples, measured for either side. The reflectivity of Samples 2 and 3 (with one polarizing layer) is not as low as when two polarizing layers is used, but is still significantly less than the references, Sample 1. Thus, the use of polarizing and retarding layers is very effective at reducing the diffuse reflectance of ambient light and image light, thus enhancing screen contrast and resolution.

Next, consider the color properties of the screens. Ideally, a screen should pass light without any effect on the color of the light transmitted. However, since the birefringence of the retarding layers is wavelength dependent, the amount of polarization rotation varies over the visible spectrum, resulting in some color effect. The magnitude of the color effect is measured by the change in the color co-ordinates, $\Delta u'$ and $\Delta v'$. The smaller the change, the smaller the effect on the color of the transmitted light. In general, the screens having polarizers with crossed optical axes, Samples 3, 5, 7, 9, and 11, demonstrate less color shift than those with parallel optical axes, Samples 2, 4, 6, 8 and 10. For example, Sample 10 has values of $\Delta u'=-0.0192$ and $\Delta v'=-0.0516$, whereas Sample 11 manifests color co-ordinate shifts of $\Delta u'=-0.0002$ and $\Delta v'=-0.0125$. A visual comparison of these screens revealed that Sample 10 has a distinct yellow color, whereas Sample 11 is relatively neutral in color, and is similar to the control, Sample 1.

Figure 13:
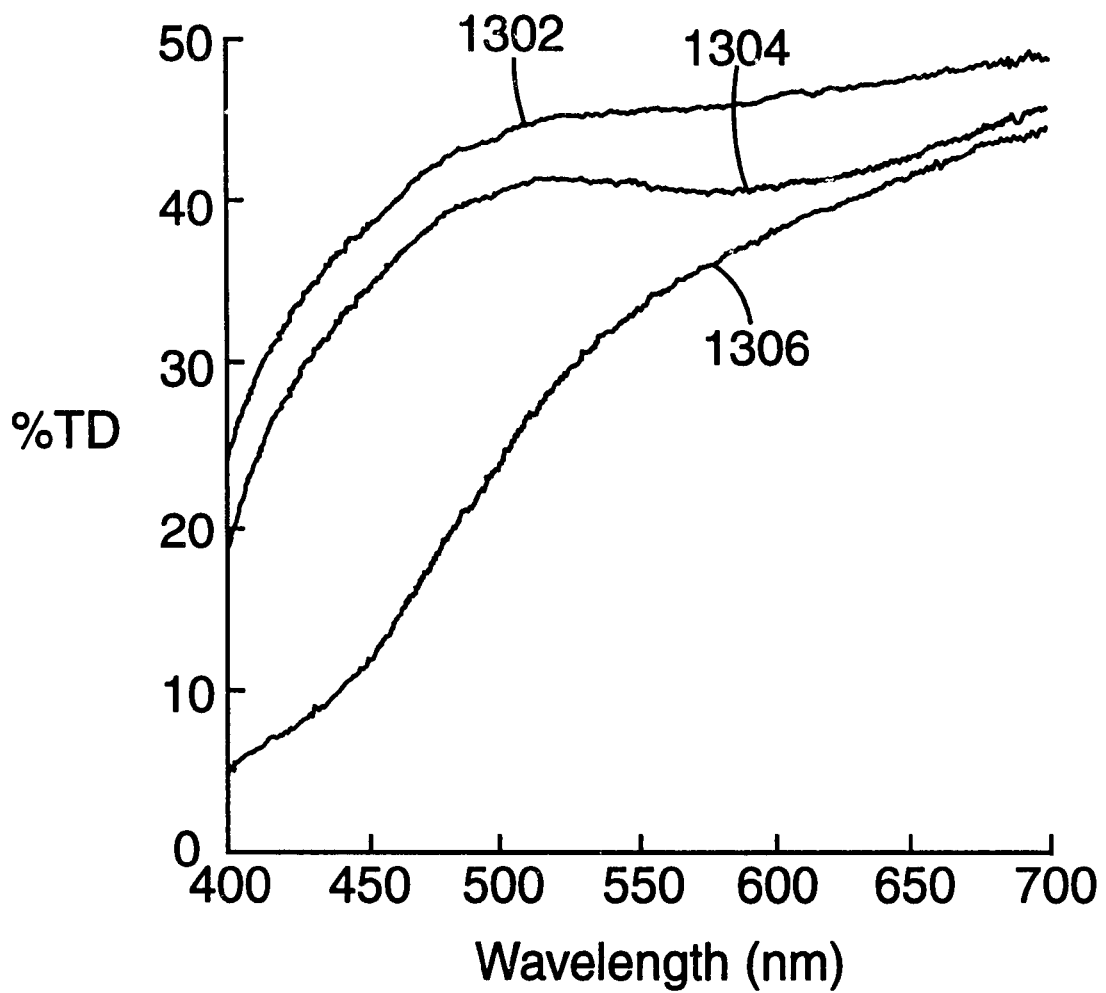
FIG. 13 shows a graph of transmission through screen assemblies of the present invention as a function of wavelength.

The transmission through Samples 1, 10 and 11 is illustrated in FIG. 13 as a function of wavelength over the range $\lambda=400$ nm to $\lambda=700$ nm. The transmission measurements were made with an unpolarized light source. The transmission of Sample 11 (curve 1304) is relatively flat, and very close to the transmission of Sample 1 (curve 1302) for all wavelengths. The difference between the transmission curves for Samples 1 and 11 arises mostly from the additional polarizer of Sample 11 on its source side. The transmission of Sample 10 (curve 1306), however, shows low transmission at short wavelengths, particularly for wavelengths below about 550 nm. The low transmission of blue light explains the apparent yellow color of Sample 10.

The difference in color shift between Samples 3, 5, 7, 9 and 11 compared with 2, 4, 6, 8 10 is a result of the different relative orientation of the optical axes of the retarding films. As has been discussed above, some colors may be passed through the second polarizing film to a greater extent than others. Where the optical axes of the retarding films are parallel, the birefringent effects of each film add in combination, whereas the birefringent effects subtract from each other where the optical axes are crossed. There is, therefore, compensation for the wavelength dependence of the birefringence in the case where the optical axes are crossed: such compensation is absent when the optical axes are parallel.

Last, consider the change in modulation depth, $\Delta$MD. Modulation depth, MD, was defined earlier as MD=(ICC−1)/(ICC+1), where ICC is the intercharacter contrast value, and ICC is given as $I_{max}/I_{min}$. $I_{max}$ and $I_{min}$ are the maximum and minimum intensity of adjacent bright and dark line pairs. The MD was measured at a relatively high resolution of four line pairs per mm, and with an ambient light level of 250 lux. The results presented for each sample show the difference between the MD for that sample and the reference. Sample 1. The MD for Sample 1 was measured to be 0.355. The MD is considerably higher for each of the samples than for the reference, and is consistent with the reduction in the diffuse reflection on the viewer's side.

As noted above, the present invention is applicable to rear projection screens, and is believed to be particularly applicable to high contrast screens that manifest a low reflection of ambient light. The present invention is also believed to be particularly applicable to screen assemblies that reduce the amount of image light diffusely reflected back to the image projector. Such performance enhances the resolution capabilities of the screen.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A projection screen assembly, comprising:
   a dispersing layer having an input side to receive light from a light source;
   a first retarding layer disposed to alter polarization of the light transmitted by the dispersing layer;
   a first polarizer disposed to substantially transmit light received from the first retarding layer in a first polarization state and to absorb light received from the first retarding layer in a second polarization state orthogonal to the first polarization state; and
   a second retarding layer disposed to transmit the light prior to entering the input side of the dispersing layer.

2. A projection screen assembly as recited in claim 1, wherein the first and second retarding layers are substantially quarter-wave retarding layers.

3. A projection screen assembly as recited in claim 1, wherein an optical axis of the first retarding layer is substantially parallel to an optical axis of the second retarding layer.

4. A projection screen assembly as recited in claim 1, wherein an optical axis of the first retarding layer is crossed relative to an optical axis of the second retarding layer.

5. A projection screen assembly as recited in claim 4, wherein the optical axis of the first retarding layer is approximately perpendicular to the optical axis of the second retarding layer.

6. A projection screen assembly as recited in claim 1, further comprising an image projector disposed to project an image of light having a preselected polarization state to the dispersing layer, and the first retarding layer is oriented to substantially convert image light received from the dispersing layer to linearly polarized light transmittable through the first polarizer.

7. A projection screen assembly as recited in claim 6, wherein the first and second retarding layers are substantially quarter-wave retarding layers.

8. A projection screen assembly as recited in claim 6, wherein the second retarding layer is attached to the dispersing layer.

9. A projection screen assembly as recited in claim 6, wherein the second retarding layer is positioned on a light path between the image projector and the dispersing layer and is separated from the dispersing layer.

10. A projection screen assembly as recited in claim 1, further comprising a second polarizer disposed on an input side of the second retarding layer.

11. A projection screen assembly as recited in claim 10, wherein the first and second polarizer are oriented with parallel pass polarization states.

12. A projection screen assembly as recited in claim 10, wherein the first and second polarizer are oriented with non-parallel pass polarization states.

13. A projection screen assembly as recited in claim 1, wherein the dispersing layer is a diffusing layer.

14. A projection screen assembly as recited in claim 1, wherein the dispersing layer is a beaded layer.

15. A projection screen assembly as recited in claim 1, wherein the dispersing layer is a lenticular layer.

16. A projection screen assembly as recited in claim 1, wherein the dispersing layer is a surface diffusing layer.

17. A projection screen assembly as recited in claim 1, wherein the dispersing layer is a holographic diffusing layer.

18. A projection screen assembly as recited in claim 1, wherein the dispersing layer is a micro-structured diffusing layer.

19. A projection screen assembly as recited in claim 1, wherein the first retarding layer is formed from an acrylonitrile-based polymer.

20. A projection screen assembly as recited in claim 1, wherein the first retarding layer is formed from a uniaxial material.

21. A projection screen assembly as recited in claim 1, wherein the first retarding layer has a retardation value, $d*\Delta n$, in the range 50 nm–500 nm, where d is a thickness of the first retarding layer and $\Delta n$ is the birefringence of the first retarding layer.

22. A projection screen assembly as recited in claim 21, wherein the retardation of the first retarding layer is in the range 100–180 nm.

23. A projection screen assembly as recited in claim 1, further comprising a dispersing layer substrate supportingly attached to the dispersing layer.

24. A projection screen assembly as recited in claim 1, further comprising a focusing element disposed on an input side of the screen assembly to change divergence of light entering the screen assembly from a light source.

25. A projection screen assembly as recited in claim 1, further comprising a matte surface finish on an input surface of the screen assembly.

26. A projection system comprising:
  a screen, including
    a light dispersing layer,
    a first polarizing layer;
    and a first retarding layer between the light dispersing layer and the first polarizing layer; and
    a second retarding layer on an input side of the light dispersing element to convert the image to a second polarization state and
  an image projector projecting an image having a first polarization state to the screen;
  wherein the first retarding layer is oriented to convert the second polarization state to a transmission polarization state substantially parallel to a transmitted polarization direction of the polarizing layer.

27. A system as recited in claim 26, wherein an optical axis of the first retarding layer is substantially parallel to an optical axis of the second retarding layer.

28. A system as recited in claim 26, wherein an optical axis of the first retarding layer is crossed relative to an optical axis of the second retarding layer.

29. A system as recited in claim 26, wherein the screen further includes a second polarizing layer disposed between the second retarding layer and the image projector.

30. A system as recited in claim 26, wherein the first retarding layer is substantially a quarter-wave retarding layer.

31. A screen assembly, comprising:
  dispersing means for dispersing light from a light source;
  first birefringent retarding means for retarding light received light from the dispersing means;
  first polarizing means for polarizing light received from the first birefringent retarding means; and
  second birefringent retarding means for retarding light transmitted to the dispersing means.

32. A screen assembly as recited claim 31, further comprising second polarizing means for polarizing light passing therethrough to the second birefringent retarding means.

33. A screen assembly for displaying an image having a first polarization state, comprising:
  a first polarizing layer oriented to substantially transmit light in the first polarization state;
  a first retarding layer disposed to receive light from the first polarizing layer; and
  a light dispersing layer disposed to receive light from the first retarding layer.

34. A screen assembly as recited in claim 33, further comprising an image projector disposed to illuminate an input surface of the first polarizing layer with the image.

35. A screen assembly as recited in claim 33, wherein the first polarizing layer, the first retarding layer and the light dispersing layer are layered together in a single, integrated screen.

36. A screen assembly as recited in claim 33, wherein the light dispersing layer includes at least one of a diffusing layer, a beaded layer, a lenticular layer, a surface diffusing layer, a holographic diffusing layer, and a micro-structured diffusing layer.

37. A screen assembly as recited in claim 33, further comprising a dispersing layer substrate supportingly attached to the dispersing layer.

38. A screen assembly as recited in claim 33, further comprising a focusing element disposed on an input side of the assembly to alter divergence of light entering the assembly.

39. An image display system, comprising
- a source producing an image with light in a first polarization state;
- a first retarder disposed to change polarization of the image light to a second polarization state; and
- a glare suppressor having a second retarder disposed to change polarization of the image light from the second polarization state to the first polarization state and a first linear polarizer disposed to transmit the image light in the first polarization state.

40. An image display system as recited in claim 39, wherein the retarding effect of the second retarder subtracts from the retarding effect of the first retarder.

41. An image display system as recited in claim 39, wherein the first retarder and the second retarder are quarter wave retarders.

42. An image display system as recited in claim 39, further comprising a dispersing layer between the first and second retarding layers.

43. An image display system as recited in claim 39, further comprising a second linear polarizer disposed between the first retarder and the source.

44. An image display system as recited in claim 39, wherein the first and second linear polarizers are oriented with parallel pass polarization directions.

* * * * *